(12) United States Patent
Suzuki

(10) Patent No.: US 9,997,975 B2
(45) Date of Patent: Jun. 12, 2018

(54) DRIVING APPARATUS

(71) Applicant: PIONEER CORPORATION, Kanagawa (JP)

(72) Inventor: Jun Suzuki, Kanagawa (JP)

(73) Assignee: PIONEER CORPORATION, Kanagawa (JP)

(*) Notice: Subject to any disclaimer, the term of this patent is extended or adjusted under 35 U.S.C. 154(b) by 554 days.

(21) Appl. No.: 14/400,168

(22) PCT Filed: Mar. 29, 2013

(86) PCT No.: PCT/JP2013/059643
§ 371 (c)(1),
(2) Date: Nov. 10, 2014

(87) PCT Pub. No.: WO2013/168485
PCT Pub. Date: Nov. 14, 2013

(65) Prior Publication Data
US 2015/0097449 A1 Apr. 9, 2015

Related U.S. Application Data

(63) Continuation of application No. PCT/JP2012/062040, filed on May 10, 2012.

(30) Foreign Application Priority Data

May 10, 2012 (WO) .................. PCT/JP2012/062040

(51) Int. Cl.
H02K 33/18 (2006.01)
G02B 26/00 (2006.01)
G02B 26/10 (2006.01)
H02K 1/34 (2006.01)
H02K 7/00 (2006.01)
(Continued)

(52) U.S. Cl.
CPC ........... *H02K 7/003* (2013.01); *G02B 26/085* (2013.01); *G02B 26/10* (2013.01); *H02K 33/18* (2013.01);
(Continued)

(58) Field of Classification Search
CPC ............... H02K 33/18; H02K 41/0354; H02K 41/0358; G02B 26/08; G02B 26/0833;
(Continued)

(56) References Cited

U.S. PATENT DOCUMENTS 6,038,104 A * 3/2000 Sato ..................... G11B 5/5552
360/294.3
7,485,485 B2 2/2009 Linden et al.
(Continued)

FOREIGN PATENT DOCUMENTS

JP 63-48623 3/1988
JP 2002-350457 12/2002
(Continued)

OTHER PUBLICATIONS

Matsuda (JP 2006293235 A, English Translation).*
International Search Report PCT/JP2013/059643 dated Jun. 25, 2013.

*Primary Examiner* — Joshua Benitez Rosario
*Assistant Examiner* — Alexander Moraza
(74) *Attorney, Agent, or Firm* — Young & Thompson

(57) ABSTRACT

A driving apparatus (101) is provided with: a base part (110); a driven part (130) which is capable of rotating; an elastic part (120a, 120b) which connects the base part and the driven part and which has elasticity for allowing the driven part to rotate around a rotational axis which is an axis along one direction (Y axis); a coil part (140) which is disposed on the base part, wherein the driven part is disposed on an outside of a winding of the coil; and a magnetic field applying part (151, 152) which applies the magnet field to the coil part.

5 Claims, 19 Drawing Sheets

(51) Int. Cl.
*H02K 41/035* (2006.01)
*G02B 26/08* (2006.01)

(52) U.S. Cl.
CPC ....... *H02K 41/0354* (2013.01); *G02B 26/105* (2013.01); *H02K 1/34* (2013.01)

(58) Field of Classification Search
CPC .. G02B 26/085; G02B 26/10; G02B 21/0048; G02B 26/101; G02B 26/103; G02B 26/105
USPC ............ 310/36, 37; 359/199.3, 200.7, 203.1, 359/210.2, 212.1, 212.2, 213.1, 220.1, 359/221.1, 223.1, 224.1, 224.2, 225.1, 359/226.1, 226.2
See application file for complete search history.

(56) References Cited

U.S. PATENT DOCUMENTS

| | | | |
|---|---|---|---|
| 2005/0099709 A1* | 5/2005 | Iwasaki | G02B 26/085 359/872 |
| 2005/0116551 A1* | 6/2005 | Yoda | H02N 1/006 310/36 |
| 2006/0098313 A1 | 5/2006 | Iwasaki et al. | |
| 2008/0100898 A1 | 5/2008 | Kang et al. | |
| 2008/0231930 A1 | 9/2008 | Mizoguchi et al. | |
| 2010/0296145 A1* | 11/2010 | Takeda | B81B 3/0059 359/223.1 |
| 2010/0296147 A1* | 11/2010 | Terada | B41J 2/471 359/224.1 |
| 2011/0199172 A1 | 8/2011 | Pirk et al. | |

FOREIGN PATENT DOCUMENTS

| | | |
|---|---|---|
| JP | 2005-165276 | 6/2005 |
| JP | 2006293235 A * | 10/2006 |
| JP | 2007-522529 | 8/2007 |
| JP | 2008-122955 | 5/2008 |
| JP | 2008-203497 | 9/2008 |
| JP | 2011-180322 | 9/2011 |
| WO | 2005078509 | 8/2005 |

* cited by examiner

[FIG. 1]
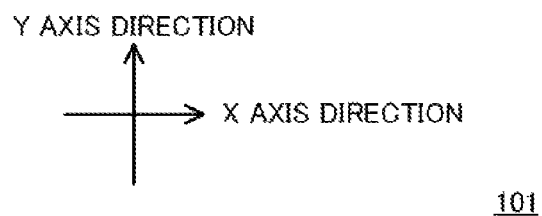
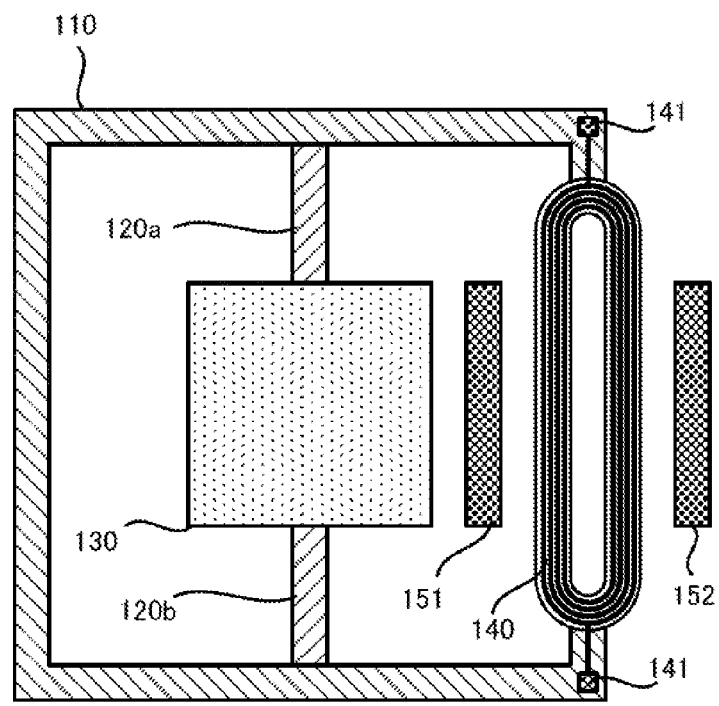

[FIG. 2]
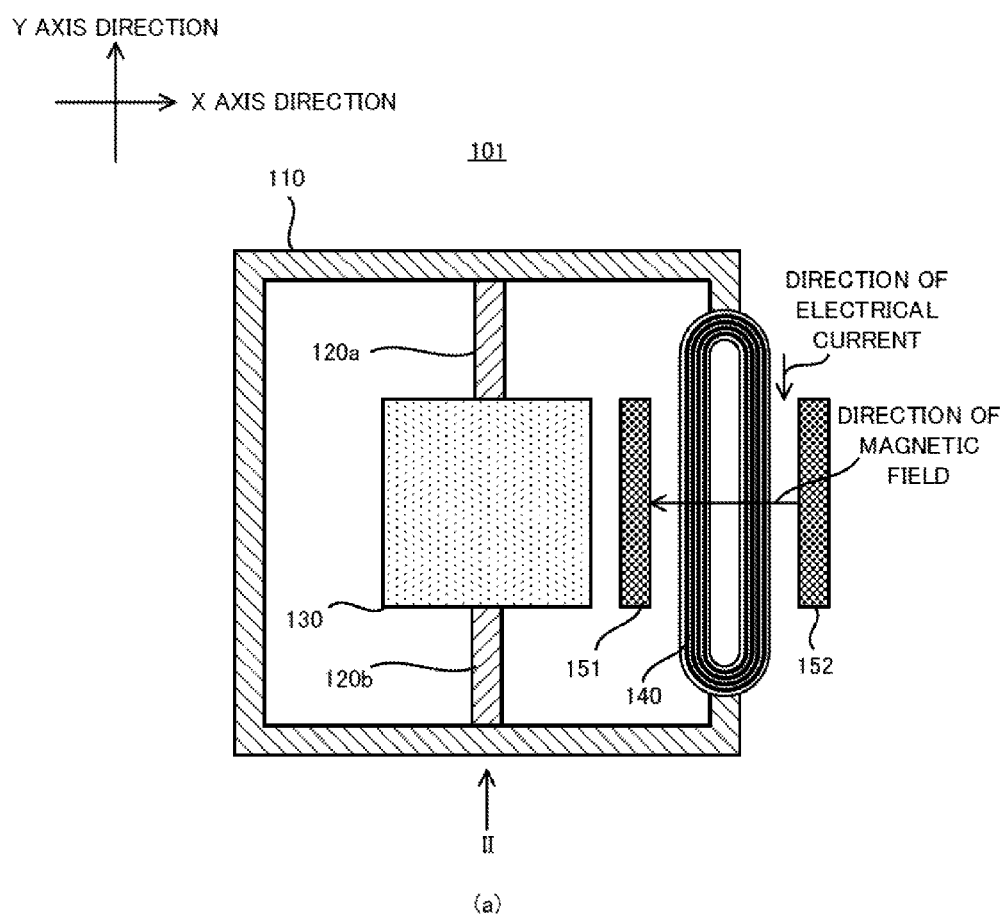
(a)
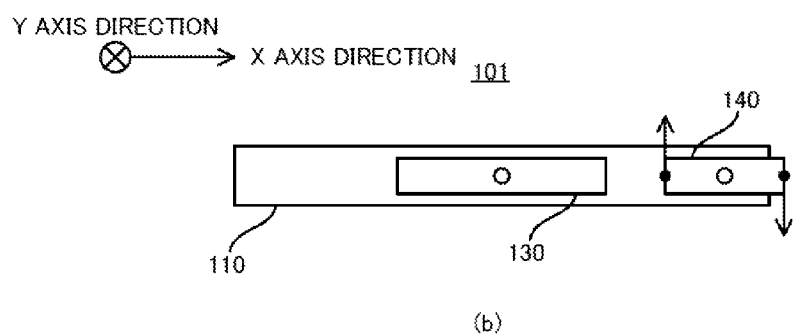
(b)

[FIG. 3]
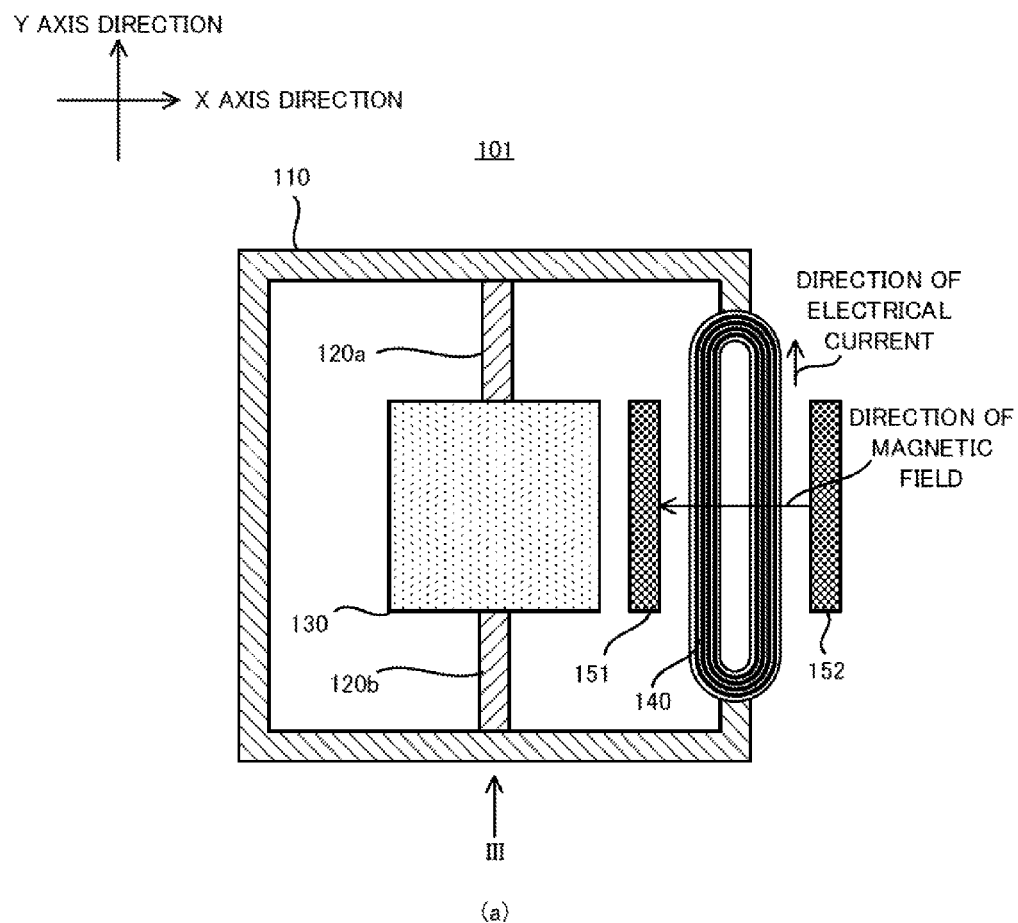
(a)
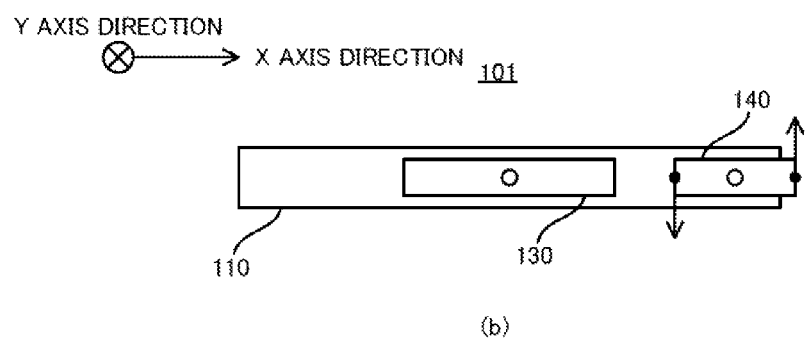
(b)

[FIG. 4]
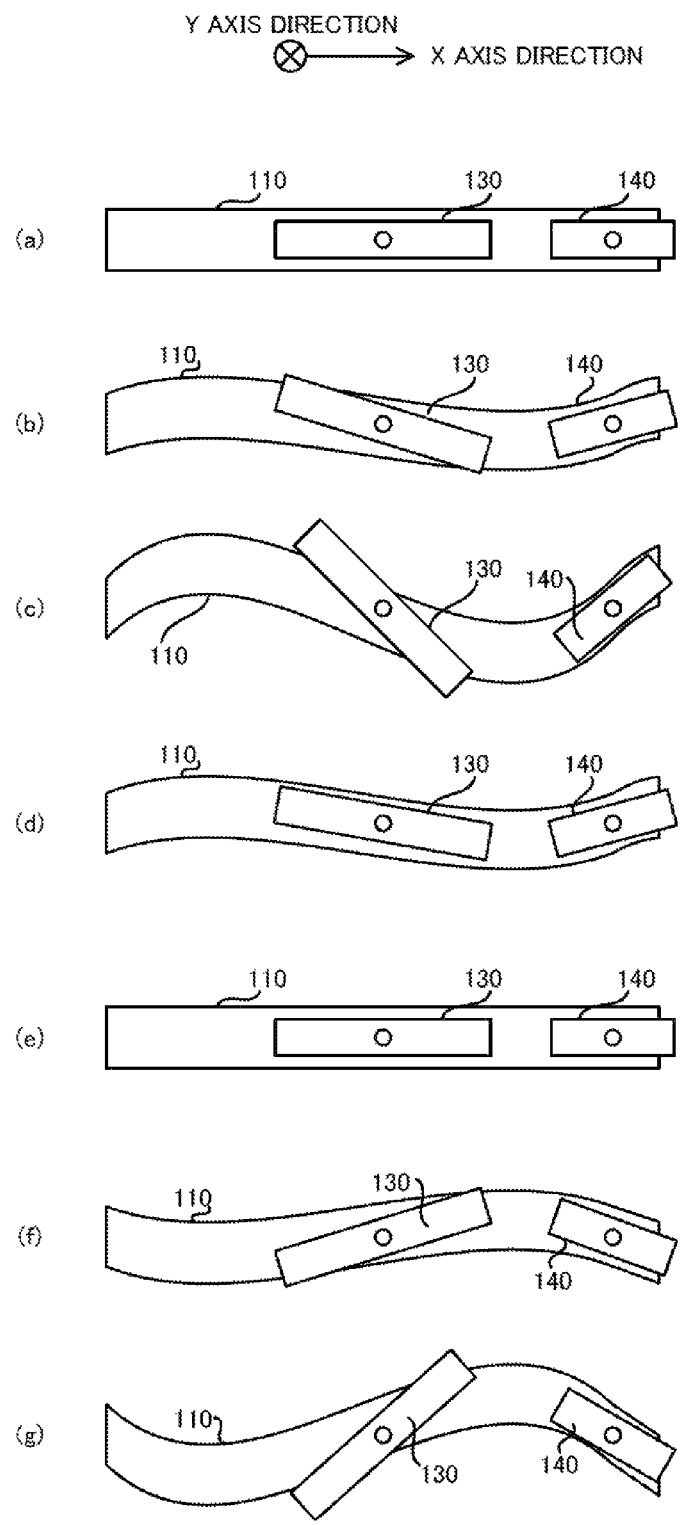

[FIG. 5]
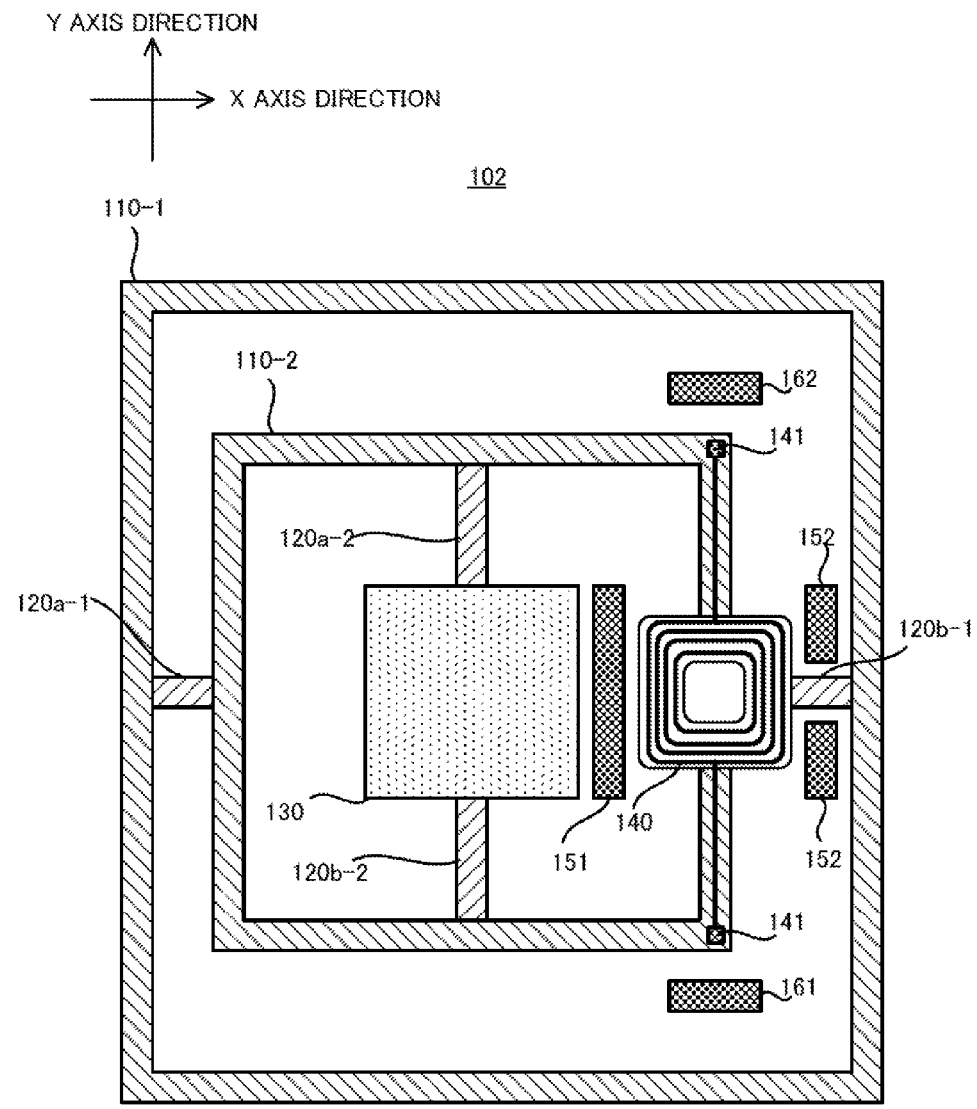

[FIG. 6]
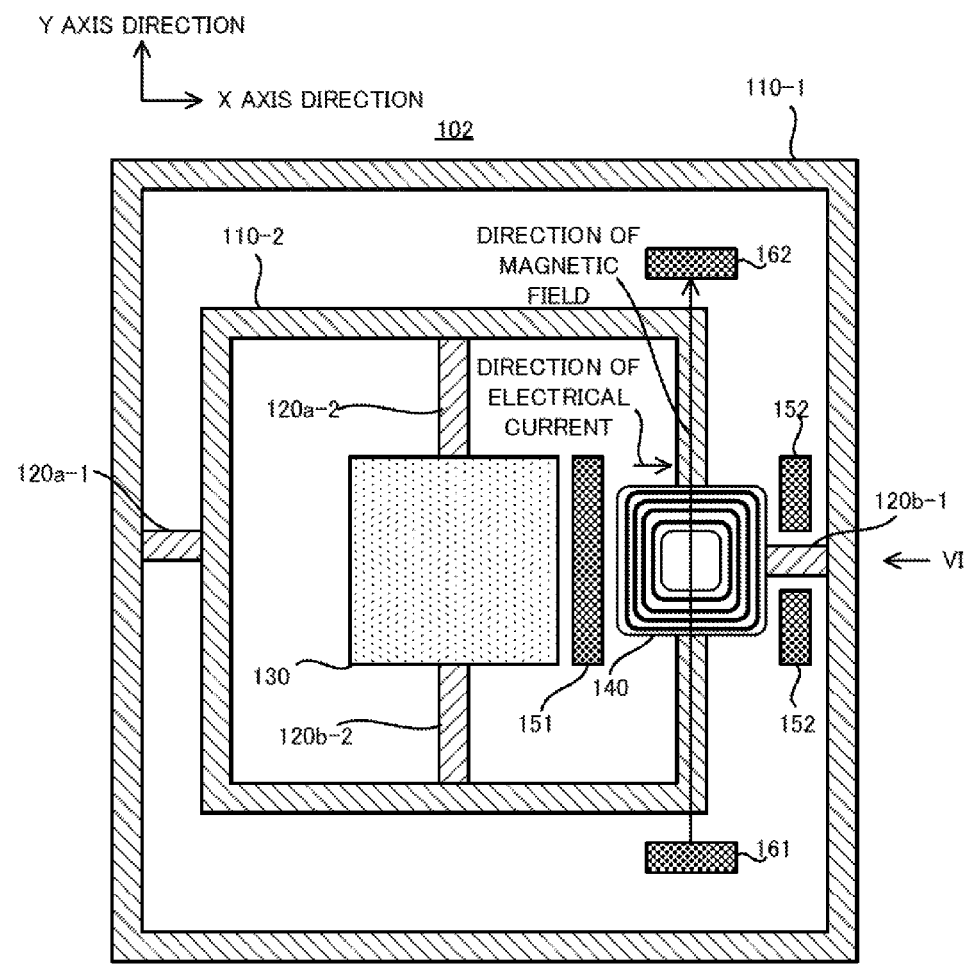
(a)
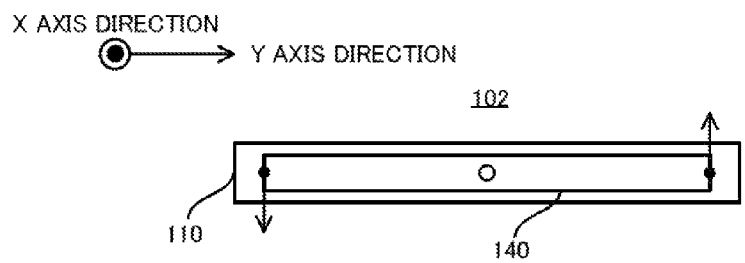
(b)

[FIG. 7]
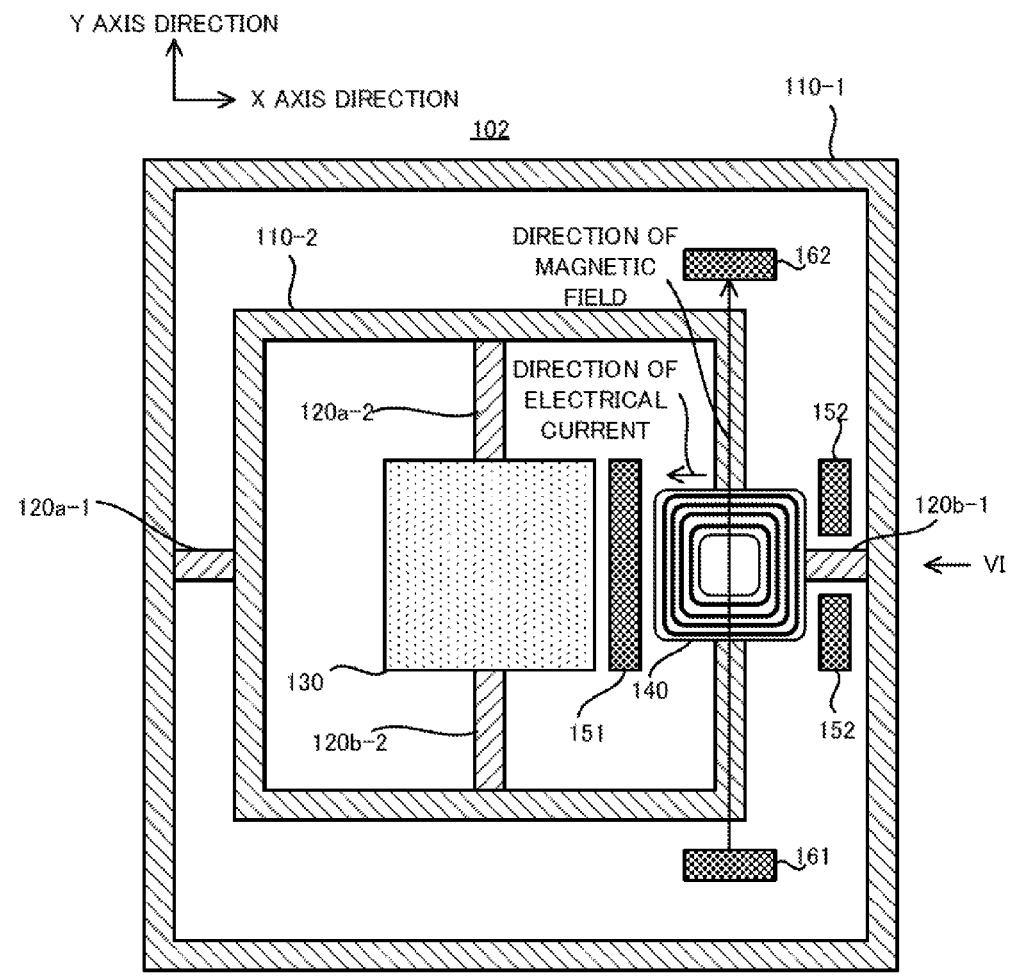
(a)
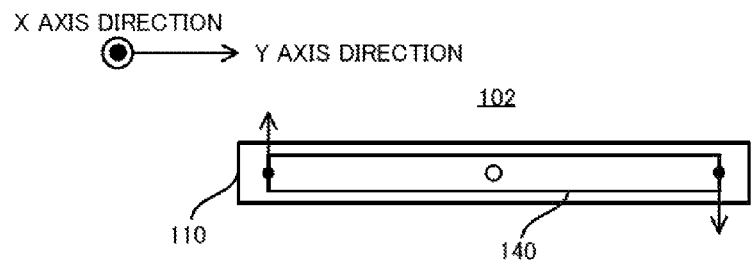
(b)

[FIG. 8]
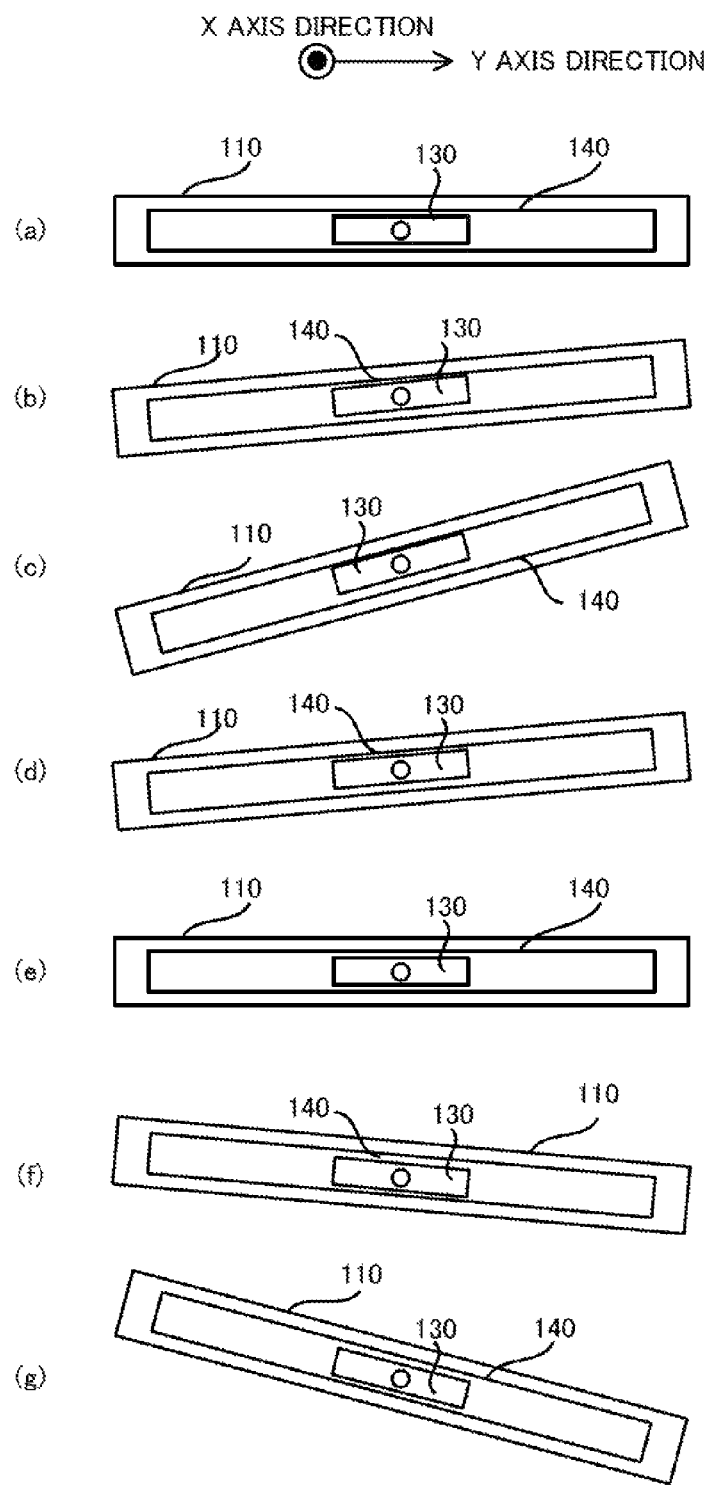

[FIG. 9]
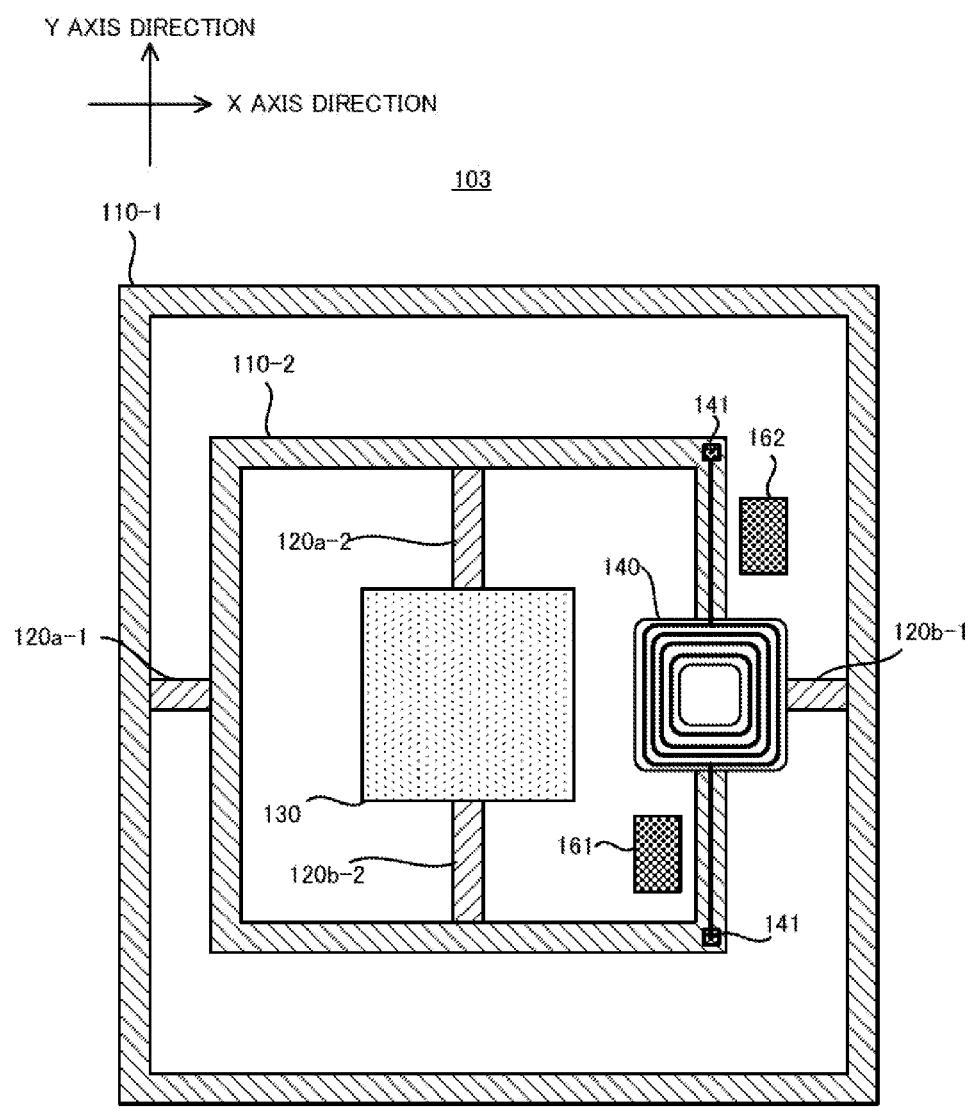

[FIG. 10]
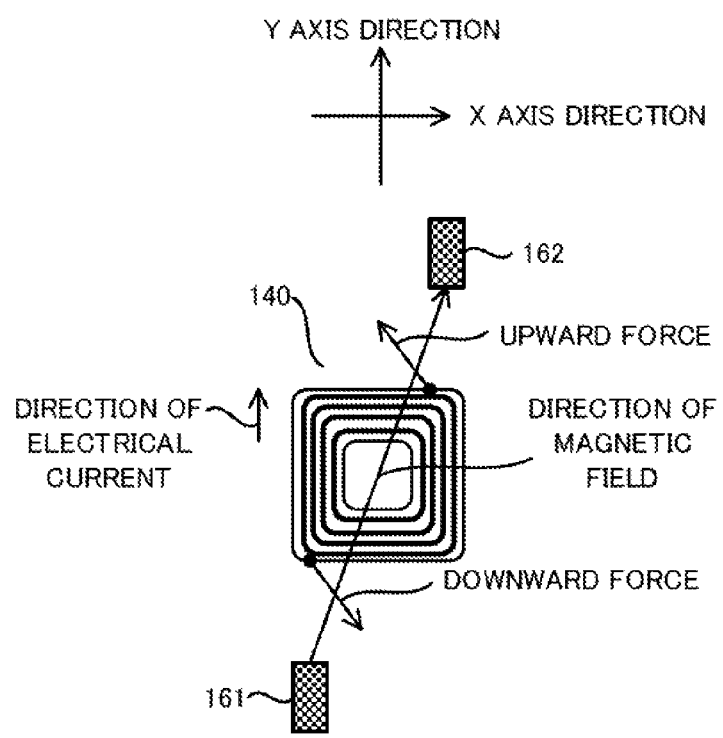

[FIG. 11]
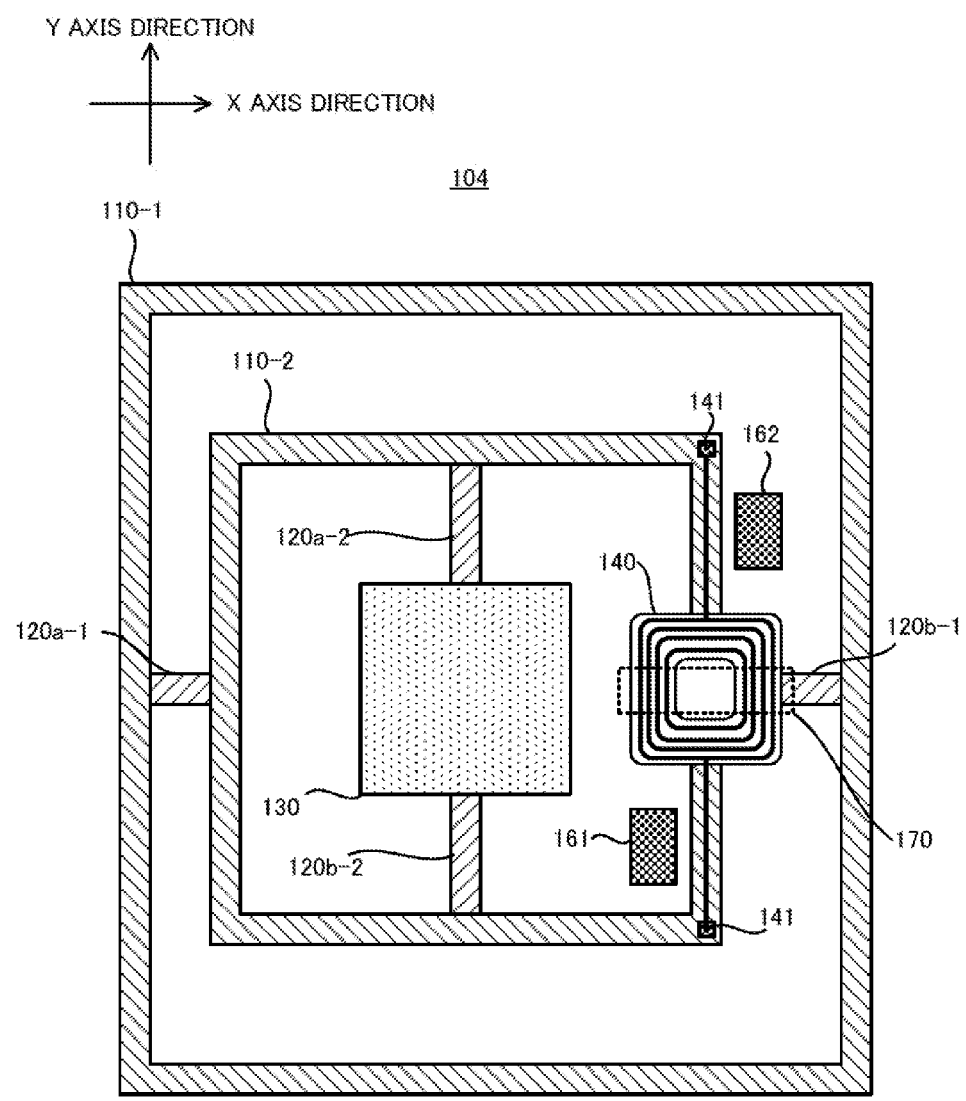

[FIG. 12]
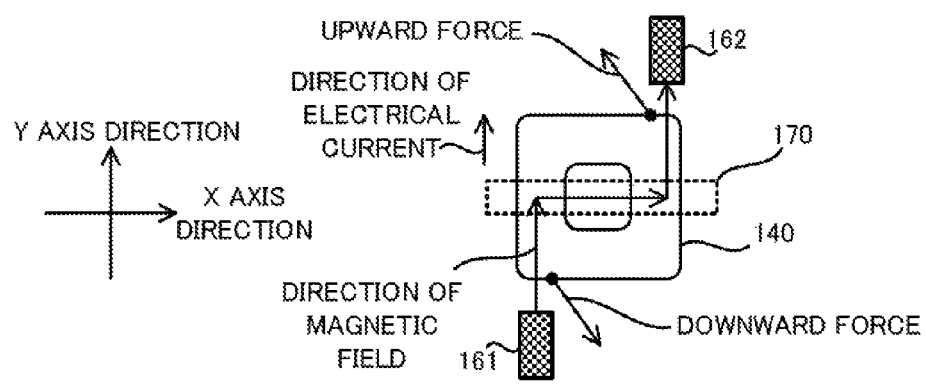
(a)
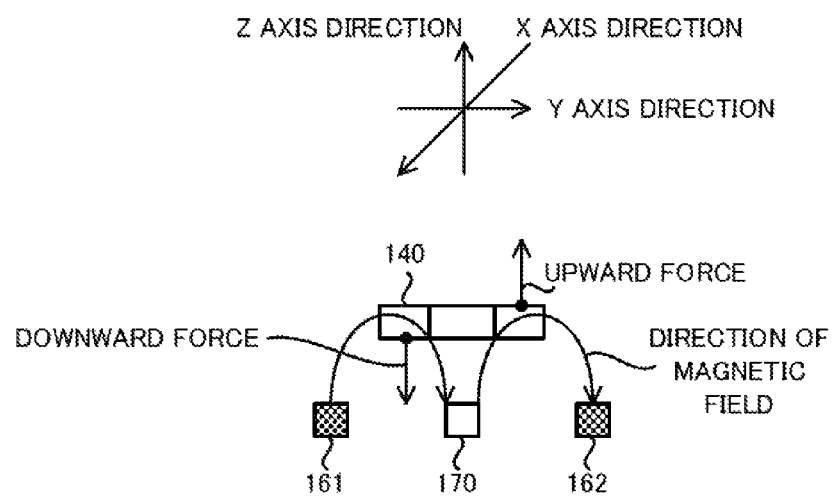
(b)

[FIG. 13]
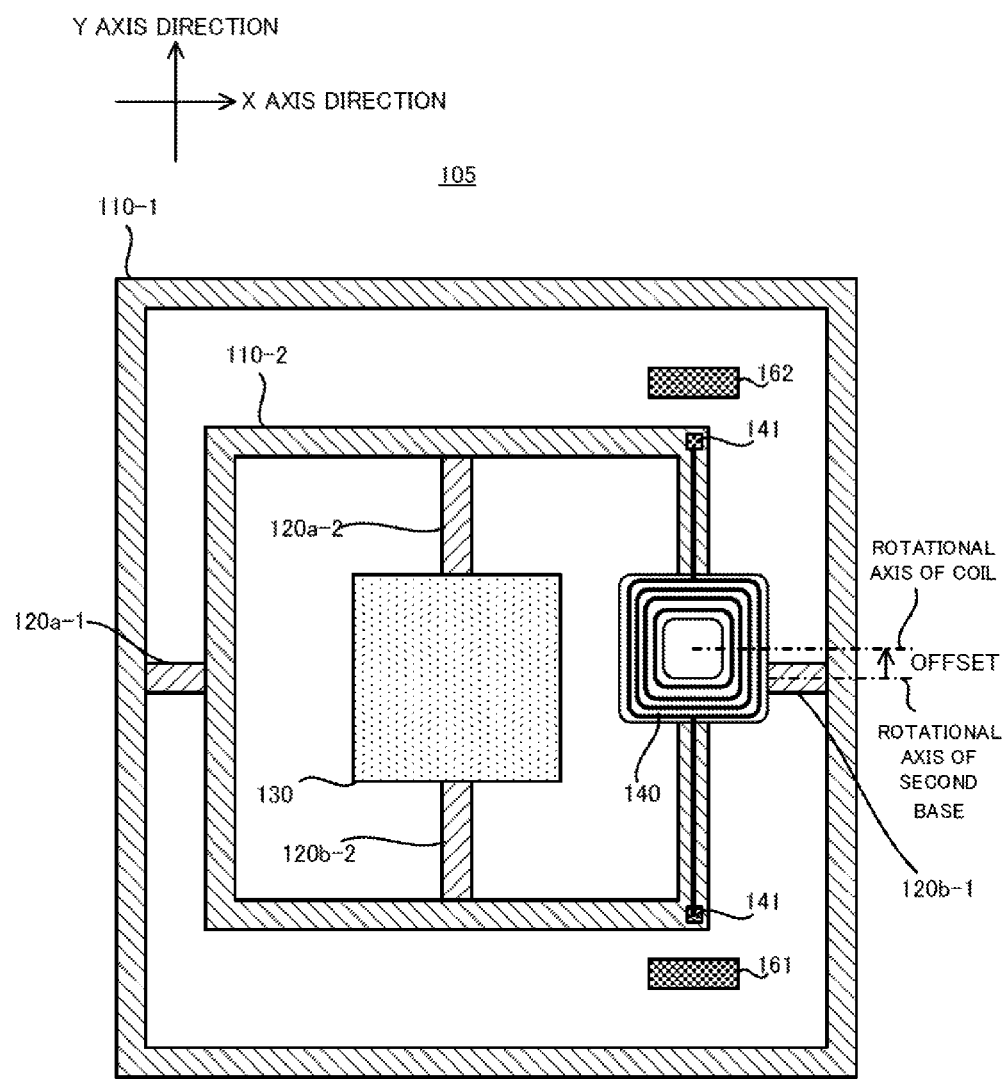

[FIG. 14]
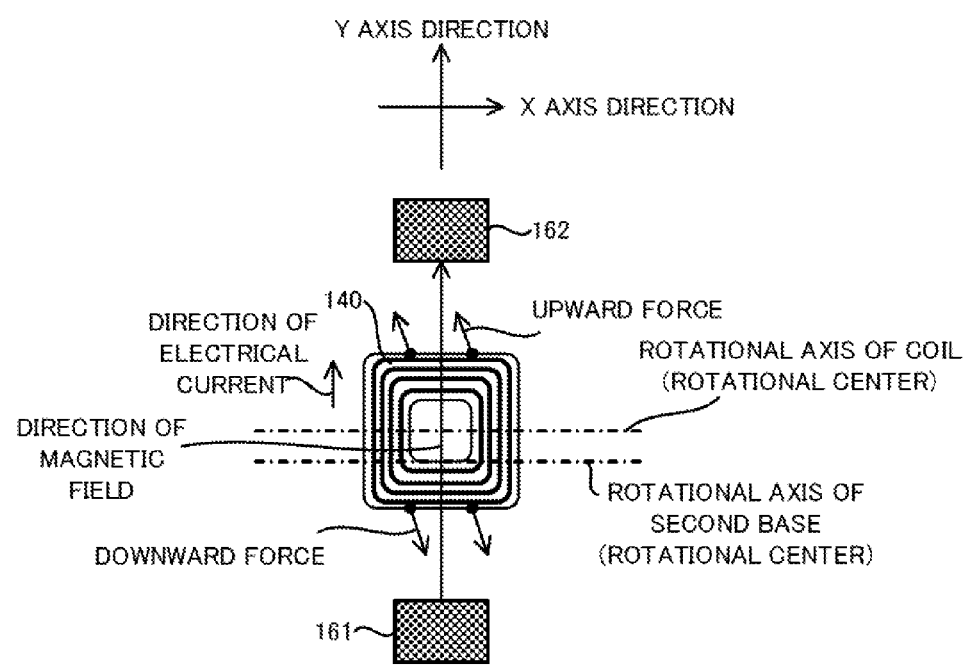

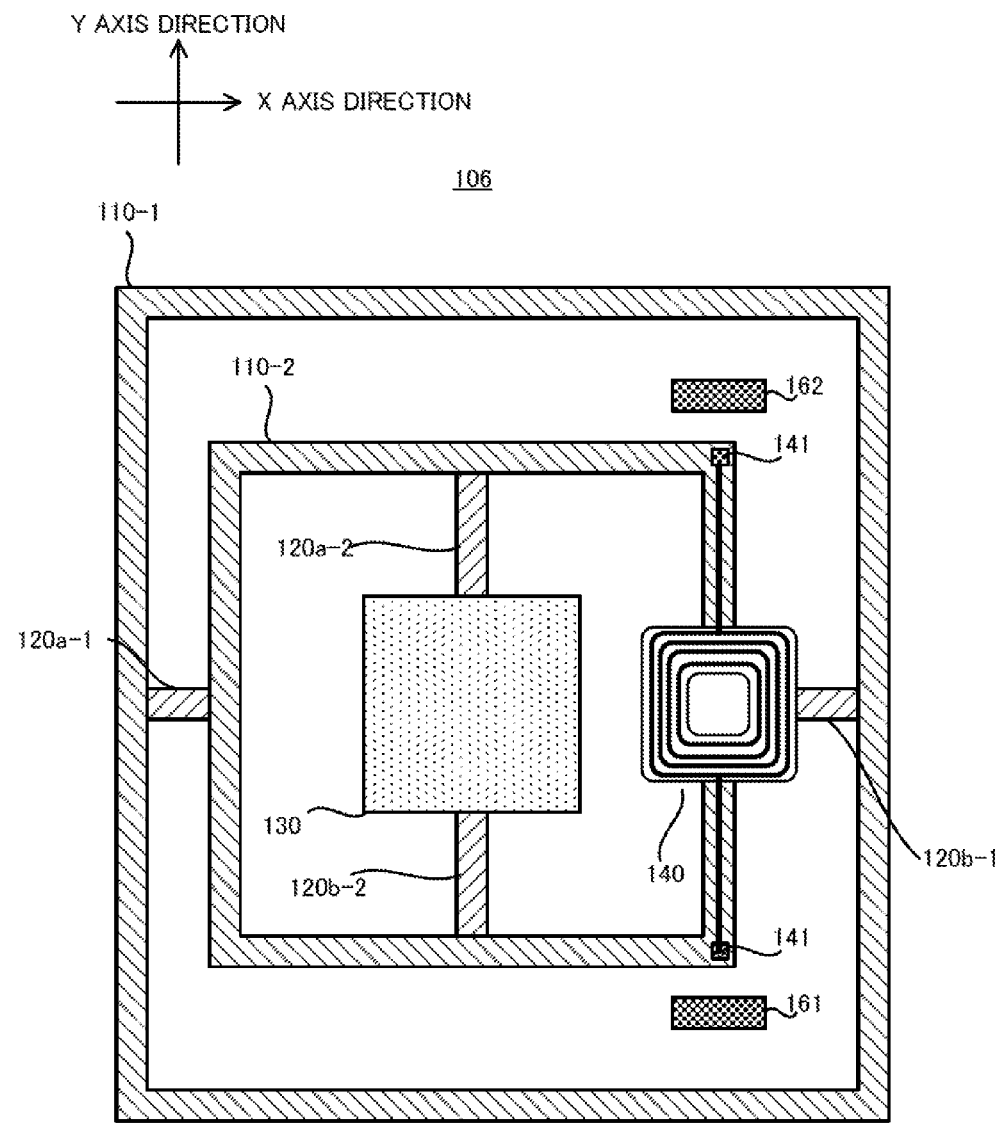

[FIG. 16]
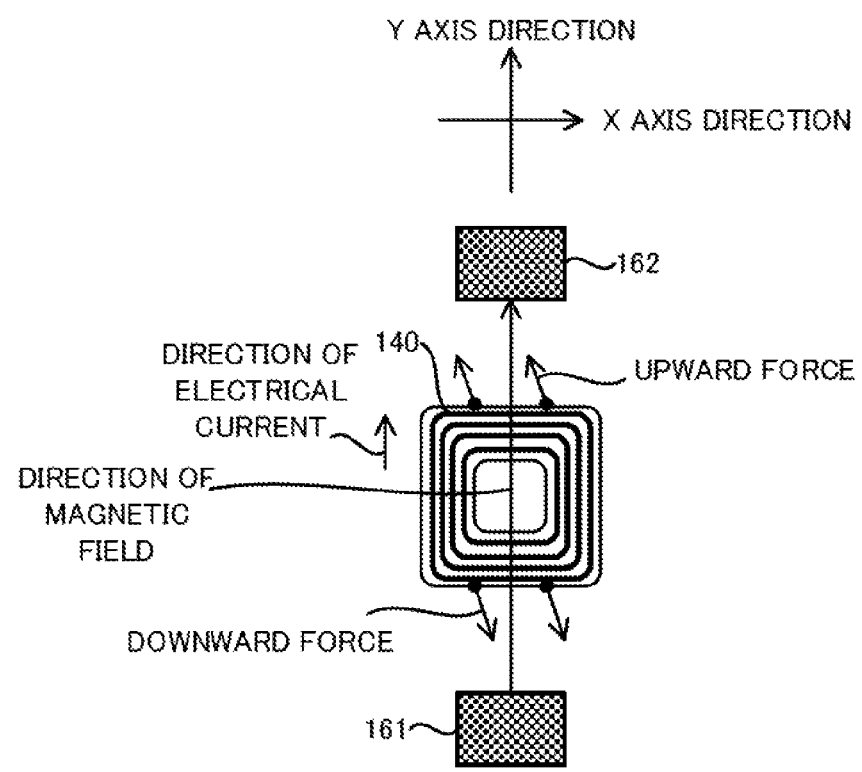

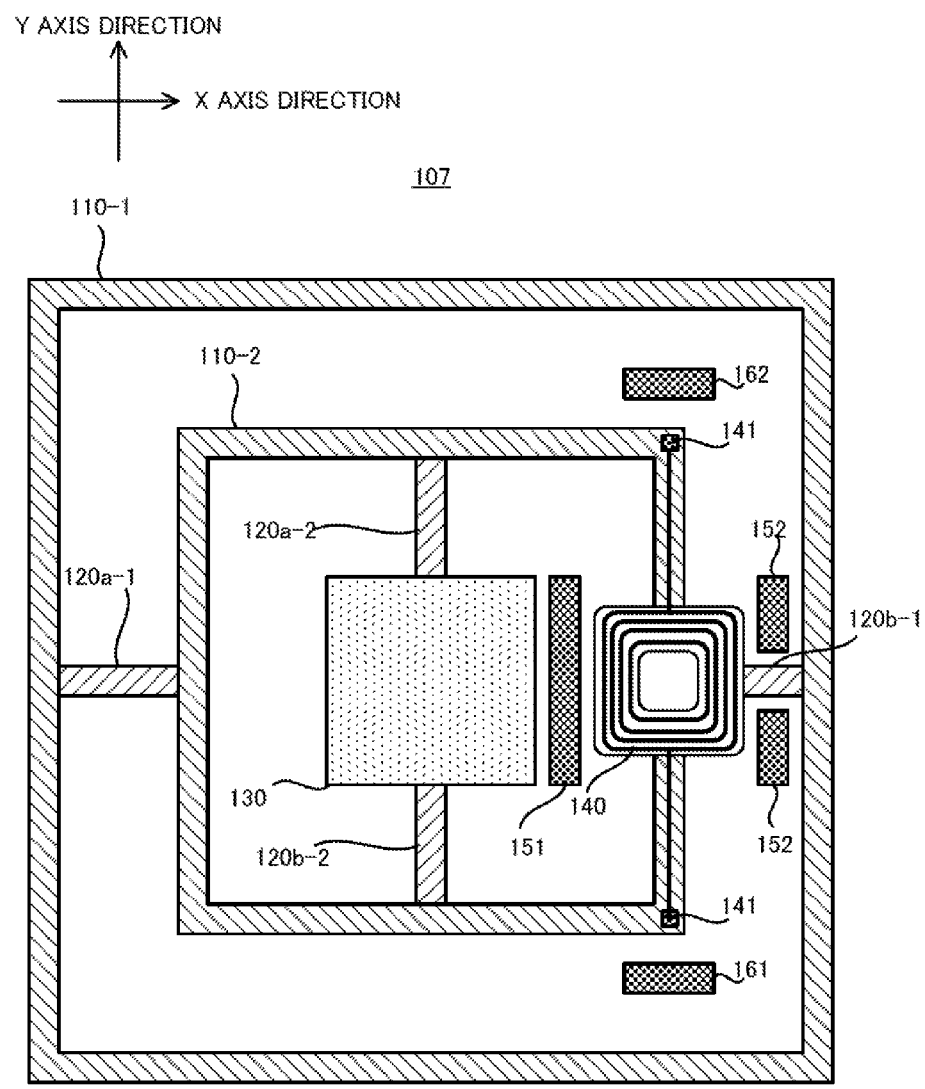
[FIG. 17]

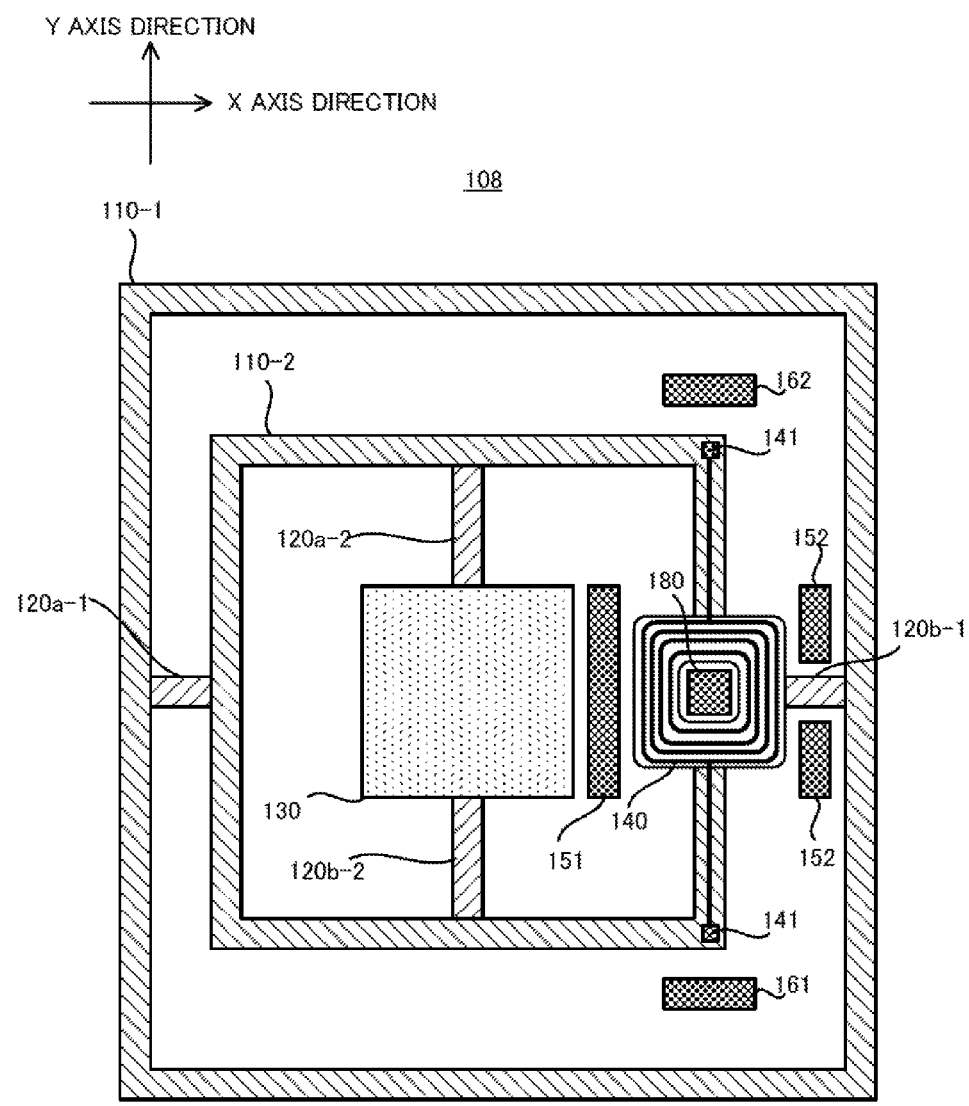
[FIG. 18]

[FIG. 19]
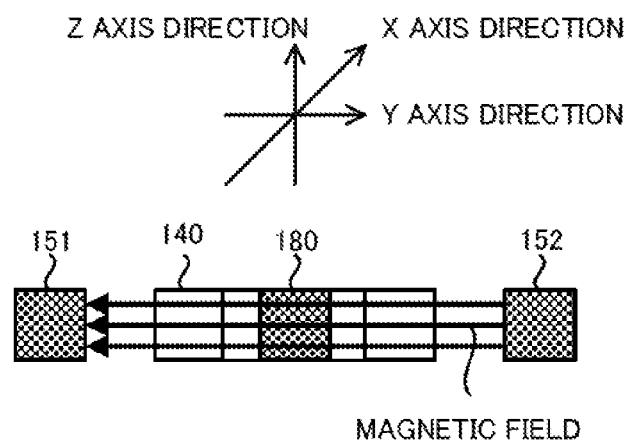
(a)
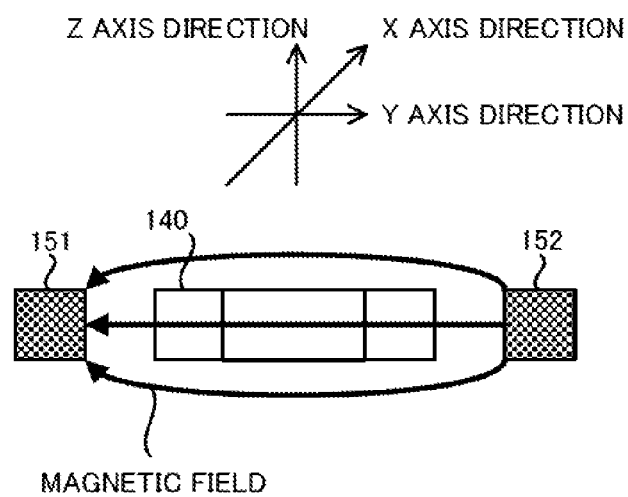
(b)

DRIVING APPARATUS

TECHNICAL FIELD

The present invention relates to a driving apparatus such as, for example, a MEMS scanner for rotating a driven object such as a mirror.

BACKGROUND ART

In various technical fields such as, for example, a display, a printing apparatus, precision measurement, precision processing, and information recording-reproduction, research on a micro electro mechanical system (MEMS) device manufactured by a semiconductor fabrication technology is actively progressing. As the MEMS device as described above, a mirror driving apparatus having a microscopic structure (a light scanner or a MEMS scanner) attracts attention, for example, in a display field in which images are displayed by scanning a predetermined screen area with a light which enters from a light source, or in a scanning field in which a predetermined screen area is scanned with a light and image information is read by receiving reflected light.

There is known a mirror driving apparatus which is provided with: a fixed main body to be a base; a mirror capable of rotating around a predetermined central axis; and a torsion bar (a torsion member) for connecting or joining the main body and the mirror (refer to a Patent Literature 1).

Moreover, a Patent Literature 2 to a Patent Literature 4 are listed as a background art document which is related to the present invention.

CITATION LIST

Patent Literature

Patent Literature 1: Published Japanese translation of a PCT application (Tokuhyo) No. 2007-522529
Patent Literature 2: Japanese Patent Application Laid Open No. 2008-122955
Patent Literature 3: Japanese Patent Application Laid Open No. 2008-203497
Patent Literature 4: Japanese Patent Application Laid Open No. Sho63-048623

SUMMARY OF INVENTION

Technical Problem

In the mirror driving apparatus having such a configuration, it is general that the mirror is driven by using a coil and a magnet. As one example of such a configuration, for example, there is listed a configuration in which the coil is directly attached to the mirror to surround the mirror. In this case, due to an interaction between a magnetic field of the magnet and a magnetic field generated by applying an electric current to the coil, a force in a rotational direction is applied to the mirror, resulting in the rotation of the mirror. Moreover, the above described Patent Literature 1 uses a configuration in which the coil and the magnet are disposed to generate a distortion of the torsion bar along a torsion direction (in other words, a direction of a rotational axis of the mirror). In this case, due to the interaction between the magnetic field of the magnet and the magnetic field generated by applying the electric current to the coil, the torsion bar gets distorted along the torsion direction and the distortion of the torsion bar along the torsion direction results in the rotation of the mirror.

However, the coil becomes relatively large, because the coil is disposed to surround the mirror. As a result, the magnet for applying the magnetic field to the coil becomes relatively large. Thus, such a technical problem occurs that a magnetic gap between the coil and the magnet becomes large and a downsizing of the MEMS scanner is impossible. Moreover, an arrangement of the magnet is restricted or it is difficult for the magnet to be disposed at an appropriate position, because the coil is disposed to surround the mirror. Specifically, it is difficult for the magnet to be disposed at an upside of a center of the coil (specifically, an upside of an inside of a winding of the coil (namely, an upside of the mirror)), because a reflection of a light by the mirror is prevented.

For the conventional mirror driving apparatus as described above, it is therefore an object of the present invention to provide a driving apparatus (i.e. MEMS scanner) which is capable of driving the mirror (or a driven object which rotates) by using the coil and the magnet and which is relatively downsized.

Solution to Problem

In order to solve the above object, the driving apparatus is provided with: a base part; a driven part which is capable of rotating; an elastic part which connects the base part and the driven part and which has elasticity for allowing the driven part to rotate around a rotational axis which is an axis along one direction; a coil part which is disposed on the base part, wherein the driven part is disposed on an outside of a winding of the coil part; and a magnetic field applying part which applies the magnet field to the coil part.

An operation and an advantage in the present invention will become apparent from the embodiments explained below.

BRIEF DESCRIPTION OF DRAWINGS

FIG. 1 is a plan view conceptually illustrating a configuration of a MEMS scanner in a first example.
FIG. 2 are plan view and cross-sectional view conceptually illustrating an aspect of operation performed by the MEMS scanner in the first example.
FIG. 3 are plan view and cross-sectional view conceptually illustrating an aspect of operation performed by the MEMS scanner in the first example.
FIG. 4 are cross-sectional views conceptually illustrating an aspect of operation performed by the MEMS scanner in the first example.
FIG. 5 is a plan view conceptually illustrating a configuration of a MEMS scanner in a second example.
FIG. 6 are plan view and cross-sectional view conceptually illustrating an aspect of operation performed by the MEMS scanner in the second example.
FIG. 7 are plan view and cross-sectional view conceptually illustrating an aspect of operation performed by the MEMS scanner in the second example.
FIG. 8 are cross-sectional views conceptually illustrating an aspect of operation performed by the MEMS scanner in the second example.
FIG. 9 is a plan view conceptually illustrating a configuration of a MEMS scanner in a third example.

FIG. 10 is a plan view conceptually illustrating an aspect of operation performed by the MEMS scanner in the third example.

FIG. 11 is a plan view conceptually illustrating a configuration of a MEMS scanner in a fourth example.

FIG. 12 are plan views conceptually illustrating an aspect of operation performed by the MEMS scanner in the fourth example.

FIG. 13 is a plan view conceptually illustrating a configuration of a MEMS scanner in a fifth example.

FIG. 14 is a plan views conceptually illustrating an aspect of operation performed by the MEMS scanner in the fifth example.

FIG. 15 is a plan view conceptually illustrating a configuration of a MEMS scanner in a sixth example.

FIG. 16 is a plan views conceptually illustrating an aspect of operation performed by the MEMS scanner in the sixth example.

FIG. 17 is a plan view conceptually illustrating a configuration of a MEMS scanner in a seventh example.

FIG. 18 is a plan view conceptually illustrating a configuration of a MEMS scanner in an eighth example.

FIG. 19 are cross-sectional views illustrating an aspect of a magnetic field applied to a coil with which the MEMS scanner in the eighth example is provided and an aspect of a magnetic field applied to a coil with which a MEMS scanner in a comparative example in which a magnetic yoke is not disposed is provided.

DESCRIPTION OF EMBODIMENT

Hereinafter, an explanation will be given to an embodiment of the driving apparatus in order.

<1>

A driving apparatus in the present embodiment is provided with: a base part; a driven part which is capable of rotating; an elastic part which connects the base part and the driven part and which has elasticity for allowing the driven part to rotate around a rotational axis which is an axis along one direction; a coil part which is disposed on the base part, wherein the driven part is disposed on an outside of a winding of the coil part; and a magnetic field applying part which applies the magnet field to the coil part.

According to the driving apparatus in the embodiment, the base part which is a foundation and the driven part (e.g. a mirror described later or the like) which is disposed to be capable of rotating are connected directly or indirectly by the elastic part (e.g. a torsion bar described later or the like) having the elasticity. The driven part rotates around the rotational axis which is the axis along the one direction by the elasticity of the elastic part (for example, the elasticity which is capable of rotating the driven part around the rotational axis which is the axis along the one direction (for example, a Y axis direction described later)). Namely, the driven apparatus of the present embodiment is capable of driving the driven part along a single axis.

In the driving apparatus in the embodiment, a force which is caused by an electromagnetic interaction between the coil part and the magnetic field applying part makes the driven part rotate around the rotational axis which is the axis along the one direction. In other words, a driving force to rotate the driven part around the rotational axis which is the axis along the one direction is an electromagnetic force which is caused by the electromagnetic interaction between the coil part and the magnetic field applying part More specifically, as described later in detail, a controlling electrical current for rotating the driven part around the rotational axis which is the axis along the one direction is supplied to the coil part. It is preferable that this controlling electrical current be an alternate electrical current whose frequency is same as or is synchronized with a frequency (in other words, a cycle) at which the driven part rotates around the rotational axis which is the axis along the one direction. More preferably, it is preferable that the controlling electrical current be an alternate electrical current whose frequency is same as or is synchronized with a resonance frequency of the driven part which is determined by the driven part and the elastic part (more specifically, a resonance frequency of the driven part which is determined by an inertial moment of the driven part and a torsion spring constant of the elastic part). On the other hand, the magnetic field is applied to the coil part by the magnetic field applying part. Thus, a Lorentz force is generated at the coil part due to the electromagnetic interaction between the controlling electrical current which is supplied to the coil part and the magnetic field which the magnetic field applying part applies. This Lorentz force makes the driven part rotate around the rotational axis which is the axis along the one direction.

Especially in the present embodiment, the coil part is disposed on the base part such that the driven part is disposed on the outside of the winding. In other words, the coil part is disposed on the base part such that the driven part is not disposed on an inside of the winding. Namely, the coil part is disposed at a position which is shifted along a predetermined direction (for example, another direction (for example, an X axis direction described later) which is different from the one direction) from a position where the driven part is disposed. More specifically, the coil part is disposed on the base part such that a center of the coil part (for example, a center of the winding) is disposed at a position which is shifted along the predetermined direction from a position where a center of the driven part is disposed. Incidentally, it is preferable that a shape of at least one portion of the base part be a shape on which the coil part is capable of being disposed.

As described above, in the present embodiment, the driven part is disposed on the outside of the winding of the coil part. Therefore, the coil part need not be disposed to surround the driven part. As a result, in the present embodiment, it is possible to relatively decrease a size of the coil part (for example, a radius of the winding, a length of the winding or the like), compared to a case where the coil part is disposed to surround the driving part. In other word, in the present embodiment, it is possible to relatively decrease the size of the coil part (for example, the radius of the winding, the length of the winding or the like) regardless of a size of the driven part. As a result, it is also possible to relatively decrease a size of the magnetic field applying part (for example, a magnet) which is to apply the magnetic field to the coil part. Thus, in the present embodiment, it is possible to decrease a magnetic gap between the coil part and the magnetic field applying part regardless of the size of the driven part, compared to the case where the coil part is disposed to surround the driving part. Therefore, in the present embodiment, a downsizing of the driving apparatus is capable of being realized appropriately, compared to the case where the coil part is disposed to surround the driving part.

Moreover, in the present embodiment, a flexibility of an arrangement of the magnetic field applying part becomes relatively high, compared to the case where the coil part is disposed to surround the driving part, because the coil part need not be disposed to surround the driven part. Thus, the magnetic field applying part is capable of being disposed at an upside of a center of the coil (specifically, an upside of the inside of the winding of the coil part).

However, the present embodiment may be provided with another coil part of which the driven part is disposed on the inside of the winding, in addition to the coil part of which the driven part is disposed on the outside of the winding. Namely, it is not required that the driving part is disposed on the outside of the winding of all coil parts which the driving part is provided with. In other words, it is enough that the driving part is disposed on the outside of the winding of at least one coil part among all coil parts which the driving part is provided with.

In addition, a plurality of coil part may be sometimes formed by single winding. Even in this case, the driving part may be disposed on the outside of the winding of one coil part among the plurality of coil parts which are formed by the single winding and the driving part may be disposed on the inside of the winding of another coil part among the plurality of coil parts which are formed by the single winding, after substantially distinguishing each of the plurality of coils which are formed by the single winding on the basis of a disposed position, a shape and the like.

<2>

In another aspect of the driving apparatus in the present embodiment, a rotational axis of the coil part along the one direction is different from the rotational axis of the driven part along the one direction.

According to this aspect, the rotational axis of the coil part along the one direction and the rotational axis of the driven part along the one direction need not correspond. Thus, a flexibility of an arrangement of the driven part becomes relatively high, compared to a case where the rotational axis of the coil part along the one direction and the rotational axis of the driven part along the one direction are required to correspond. Thus, the driven part is capable of being disposed on the outside of the winding of the coil part easily. Therefore, the above described various effect is capable of being realized appropriately.

Incidentally, it is preferable that the rotational axis of the coil part along the one direction be shifted along the another direction from the rotational axis of the driven part along the one direction. Namely, it is preferable that the coil part be disposed on the base part such that the center of the coil part (for example, the center of the winding) is disposed at a position which is shifted along the another direction from the center of the driven part.

Moreover, the rotation of the coil part around the rotational axis which is the axis along the one direction and the rotation of the driven part around the rotational axis which is the axis along the one direction will be explained later in detail.

<3>

In another aspect of the driving apparatus in the present embodiment, a Lorentz force makes the coil part rotate around a rotational axis which is an axis along the one direction, the Lorentz force being generated at the coil part due to an electromagnetic interaction between a controlling electrical current which is supplied to the coil part and the magnetic field which the magnetic field applying part applies, the base part vibrates and deforms in a shape of stationary wave along another direction which is different from the one direction due to the rotation of the coil part around the rotational axis which is the axis along the one direction, the driven part rotates around the rotational axis which is the axis along the one direction due to the deformational vibration of the base part.

According to this aspect, the force which is caused by the electromagnetic interaction between the coil part and the magnetic field applying part makes the driven part rotate around the rotational axis which is the axis along the one direction. Hereinafter, a specific aspect of the rotation of the driven part around the rotational axis which is the axis along the one direction will be explained.

The controlling electrical current for rotating the driven part around the rotational axis which is the axis along the one direction is supplied to the coil part. On the other hand, the magnetic field is applied to the coil part by the magnetic field applying part. Thus, the Lorentz force is generated at the coil part due to the electromagnetic interaction between the controlling electrical current which is supplied to the coil part and the magnetic field which the magnetic field applying part applies.

This Lorentz force makes the coil part rotate (more specifically, drive in a back and forth manner so as to rotate) around the rotational axis which is the axis along the one direction. In order to realize the rotation of the coil part around the rotational axis which is the axis along the one direction like this, it is preferable that the Lorentz force, which acts in different directions respectively, be simultaneously applied to two sides of the coil part which face to each other along the another direction which is different from (preferably, which intersects, more preferably, which is perpendicular to) the one direction. For example, it is preferable that the Lorentz force, which is applied at one timing, be a force which acts as an upward force to one side among the two sides of the coil part which face to each other along the another direction and a force which acts as a downward force to another side among the two sides of the coil part which face to each other along the another direction. Furthermore, it is preferable that the Lorentz force, which is applied at another timing which is after or before the one timing, be a force which acts as the downward force to the one side among the two sides of the coil part which face to each other along the another direction and a force which acts as the upward force to the another side among the two sides of the coil part which face to each other along the another direction. If the above described Lorentz force is generated at the coil part, the coil part rotates around the rotational axis which is the axis along the one direction.

The base part on which the coil part is disposed vibrates and deforms in the shape of the stationary wave (namely, in a waveform shape of the stationary wave) along the another direction, with the rotation of the coil part around the rotational axis which is the axis along the one direction. Namely, the base part deforms its external appearance such that one portion of the base part becomes an antinode of the deformational vibration and another portion of the base part becomes a node of the deformational vibration. Due to such a deformational vibration of the base part, the node and the antinode appear along the another direction. The positions of the node and the antinode are substantially fixed, because the deformational vibration of the base part is performed in accordance with the waveform of the so-called stationary wave. The deformational vibration may be a resonance. Moreover, a resonance frequency at which the base part resonates (namely, a frequency of the deformational vibration of the base part) may be same as a frequency at which the driven part rotates (alternatively, the resonance frequency of the driven part).

The driven part rotates around the rotational axis which is the axis along the one direction, due to the deformational vibration of the base part like this. The driven part may rotate around the rotational axis which is the axis along the one direction so as to resonate at the resonance frequency of the driven part which is determined by the driven part and the elastic part (more specifically, the resonance frequency of the driven part which is determined by the inertial moment of the driven part and the torsion spring constant of the elastic part).

<4>

In another aspect of the driving apparatus in which the Lorentz force makes the coil part rotate as described above, nodes of the deformational vibration of the base part appear at positions which correspond to the rotational axis of the coil part along the one direction and the rotational axis of the driven part along the one direction, an antinode of the deformational vibration of the base part appears at a position between the rotational axis of the coil part along the one direction and the rotational axis of the driven part along the one direction.

According to this aspect, the driven part is connected to the position which corresponds to the node of the deformational vibration of the base part. Moreover, the coil part is connected to the position which corresponds to the node of the deformational vibration of the base part. Thus, a movement or a vibration of the driven part and the coil part along a vertical direction (specifically, a direction which is perpendicular to each of the one direction and the another direction and a direction which is perpendicular to a surface of the base part) is capable of being prevented. Therefore, a high accurate rotation of the driven part is capable of being realized.

<5>

In another aspect of the driving apparatus in which the Lorentz force makes the coil part rotate as described above, a rotational direction of the coil part around the rotational axis which is the axis along the one direction and a rotational direction of the driven part around the rotational axis which is the axis along the one direction are opposite to each other.

According to this aspect, the driven part rotates around the rotational axis which is the axis along the one direction by using the deformational vibration of the base part which is caused by the rotation of the coil part around the rotational axis which is the axis along the one direction.

Incidentally, one can argue that an example in which the rotational direction of the coil part around the rotational axis which is the axis along the one direction and the rotational direction of the driven part around the rotational axis which is the axis along the one direction are opposite to each other is an example in which the rotational direction of the coil part around the rotational axis which is the axis along the one direction and a rotational direction (in other words, a pseudo rotational direction which is accompanied by the deformational vibration) of the base part which corresponds to the driven part (for example, which corresponds to a portion which support the driven part) are opposite to each other.

However, when the base part vibrates and deforms in a higher order vibration mode, the rotational direction of the base part around the rotational axis which is the axis along the one direction and the rotational direction of the base part which corresponds to the driven part may be opposite to each other. Namely, the rotational direction of the coil part around the rotational axis which is the axis along the one direction and the rotational direction of the base part around the rotational axis which is the axis along the one direction may be same as each other.

<6>

In another aspect of the driving apparatus in the present embodiment, the magnetic field applying part comprises: (i) a first magnetic field applying part which is disposed on the outside of the winding of the coil part; and (ii) a second magnetic field applying part which is disposed on an inside of the winding of the coil part.

According to this aspect, it is possible to increase an efficiency of applying the magnetic field to the coil part by the magnetic field applying part, compared to a driving apparatus in which the magnetic field applying device is disposed on only either one of the inside and the outside of the winding of the coil.

<7>

In another aspect of the driving apparatus in which the magnetic field applying part is provided with the first magnetic field applying part and the second magnetic field applying part, the first magnetic field applying part is a magnet and the second magnetic field applying part is a yoke.

According to this aspect, it is possible to increase the efficiency of applying the magnetic field to the coil part by the magnetic field applying part, compared to a driving apparatus in which the magnetic field applying device is disposed on only either one of the inside and the outside of the winding of the coil, because the magnetic field applying device is disposed on each of the inside and the outside of the winding of the coil.

These operation and other advantages in the present embodiment will become more apparent from the examples explained below.

As explained above, the driving apparatus in the present embodiment is provided with: the base part; the driven part which is disposed on the outside of the winding of the coil part; the elastic part; the coil part; and the magnetic field applying part. Therefore, the driving apparatus which is capable of driving the driven part by using the coil part and the magnet field applying part and which is relatively downsized is provided.

EXAMPLES

Hereinafter, with reference to the drawings, examples of the driving apparatus will be explained. Incidentally, hereinafter, an explanation will be given to an example in which the driving apparatus is applied to a MEMS scanner.

(1) First Example

Firstly, with reference to FIG. 1 to FIG. 4, a first example of the MEMS scanner will be explained.

(1-1) Configuration of MEMS Scanner

Firstly, with reference to FIG. 1, a configuration of a MEMS scanner 101 in the first example will be explained. FIG. 1 is a plan view conceptually illustrating the configuration of the MEMS scanner 101 in the first example.

As illustrated in FIG. 1, the MEMS scanner 101 in the first example is provided with: a base 110; torsion bars 120a and 120b; a mirror 130; a coil 140; and magnets 151 and 152.

The base 110 has a frame shape with a space therein. Namely, the base 110 has a frame shape having two sides extending along a Y axis direction in FIG. 1 and two sides extending along a X axis direction (i.e. a direction perpendicular to the Y axis direction) in FIG. 1 and having a space surrounded by the two sides extending along the Y axis direction and the two sides extending along the X axis direction. In an example illustrated in FIG. 1, the base 110 has, but not limited to, a square shape. For example, the base 110 may have another shape (e.g. rectangular shape such as an oblong, a circular shape, or the like). Moreover, the base 110 is a structure which is the foundation of the MEMS scanner 101 in the first example and is preferably fixed to a not-illustrated substrate or support member (in other words, is fixed in the inside of a system which is the MEMS scanner 101). Alternatively, the base 110 may be suspended by a not-illustrated suspension or the like.

Incidentally, FIG. 1 illustrates the example in which the base 110 has the frame shape, but obviously the base 110 may have another shape. For example, the base 110 may have a U shape in which one portion of the sides is open. Alternatively, for example, the base 110 may have a box shape with a space therein. In other words, the base 110 may have a box shape having two surfaces distributed on a plane defined by the X axis and the Y axis, two surfaces distributed on a plane defined by the X axis and the not-illustrated Z axis (i.e. the axis perpendicular to both of the X axis and the Y axis), and two surfaces distributed on a plane defined by the Y axis and the not-illustrated Z axis, and having a space surrounded by the six surfaces. Alternatively, the shape of the base 110 may be arbitrarily changed depending on an arrangement aspect of the mirror 130.

Each of the torsion bars 120a and 120b is, for example, an elastic member such as a spring made of silicone, copper alloy, iron-based alloy, other metal, resin, or the like. Each of the torsion bars 120a and 120b is disposed to extend along the Y axis direction in FIG. 1. In other words, each of the torsion bars 120a and 120b has a shape having a long side extending along the Y axis direction and a short side extending along the X axis direction. However, in accordance with a setting situation of a resonance frequency described later, each of the torsion bars 120a and 120b may have a shape having a short side extending along the Y axis direction and a long side extending along the X axis direction. One end of each of the torsion bars 120a and 120b is connected to the base 110. The other end of each of the torsion bars 120a and 120b is connected to the mirror 130. Namely, the torsion bars 120a and 120b suspends the mirror 130 such that the mirror 130 is inserted therebetween.

The mirror 130 is disposed in the space in the inside of the base 110 to be suspended or supported by the torsion bars 120a and 120b. The mirror 130 is configured to rotate around a rotational axis which is an axis along the Y axis direction, by the elasticity of the torsion bars 120a and 120b.

The coil 140 is a plurality of windings which are made of a material (for example, a gold, a cupper or the like) whose electrical conductivity is relatively large for example. In the first example, the coil 140 has a rectangular shape. Especially lengths of two sides along the X axis direction (namely, a direction which is perpendicular to a direction of the rotational axis of the mirror 130) among four sides of the coil 140 are shorter than lengths of two sides along the Y axis direction (namely, the direction of the rotational axis of the mirror 130) among the four sides of the coil 140. In other words, the coil 140 has two long sides which face to each other along the X axis direction and two short sides which face to each other along the Y axis direction. Namely, the coil 140 has an oblong shape. However, the coil 140 has an arbitrary shape (for example, a square shape, a diamond shape, a parallelogram, a circular shape, an ellipsoidal shape or another arbitrary loop shape).

The coil 140 is disposed on the base 110. Especially, the coil 140 is disposed on the base 110 such that the coil 140 is located (especially, a center or a gravity center of the coil 140 is located) on a position which is shifted by a predetermined distance along the X axis direction (namely, the direction which is perpendicular to the direction of the rotational axis of the mirror 130) from a position where the mirror 130 is disposed (especially, a center or a gravity center of the mirror 130 is disposed). However, the coil 140 may be disposed on the base 110 such that the coil 140 is located on a position which is shifted by a predetermined distance along the Y axis direction (namely, the direction of the rotational axis of the mirror 130) from a position where the mirror 130 is disposed. In addition, the coil 140 is disposed on the base 110 such that the mirror 130 and the coil 140 align along the X axis direction. As a result, the mirror 130 is located on an outside of the winding which constitutes the coil 140. In other words, the mirror 130 is not located on an inside of the winding which constitutes the coil 140.

A controlling electrical current for rotating the mirror 130 is supplied from a power source to the coil 140 via a supply terminals 141 which are formed on the base 110. The controlling electrical current is typically an alternating electrical current including a signal component whose frequency is same as or synchronized with a frequency at which the mirror 130 rotates around the rotational axis which is an axis along the Y axis direction. Incidentally, the power source may be a power source with which the MEMS scanner 101 itself is provided or a power source which is equipped on an outside of the MEMS scanner 101.

The magnets 151 and 152 are disposed such that the magnets 151 and 152 align along the X axis direction. Especially, the magnets 151 and 152 are disposed such that the coil 140 is inserted between the magnets 151 and 152 along the X axis direction. In addition, one of the magnets 151 and 152 is an output-side of a magnetic flux and the other one of the magnets 151 and 152 is an input-side of the magnetic flux. Incidentally, hereinafter, an example in which the magnet 151 is the input-side of the magnetic flux and the magnet 152 is the output-side of the magnetic flux will be explained.

(1-2) Operation of MEMS Scanner

Next, with reference to FIG. 2 to FIG. 4, an explanation will be given to an aspect of the operation of the MEMS scanner 101 in the first example (specifically, an aspect of the operation of rotating the mirror 130). FIG. 2 are plan view and cross-sectional view conceptually illustrating an aspect of the operation performed by the MEMS scanner 101 in the first example. FIG. 3 are plan view and cross-sectional view conceptually illustrating an aspect of the operation performed by the MEMS scanner 101 in the first example. FIG. 4 are cross-sectional views conceptually illustrating an aspect of the operation performed by the MEMS scanner 101 in the first example.

In operation of the MEMS scanner 101 in the first example, firstly, the controlling electrical current is supplied to the coil 140. The controlling electrical current includes an electrical current component for rotating the mirror 130 around the rotational axis which is the axis along the Y axis direction. In the first example, the mirror 130 rotates around the rotational axis which is the axis along the Y axis direction to resonate at a resonance frequency which is determined by the mirror 130 and the torsion bars 120a and 120b (more specifically, an inertial moment of the mirror 130 and a torsion spring constant of the torsion bars 120a and 120b). Incidentally, in a strict sense, it is preferable that the resonance frequency which is determined by the mirror 130 and the torsion bars 120a and 120b be minor-amended with a mass and an inertial moment of the base 110 which supports the torsion bars 120a and 120b be considered. However, hereinafter (especially, not only the first example but also another example are included), for the purpose of the clarification of the explanation, the explanation will be given while the minor amendment of the resonance frequency is omitted. Therefore, the controlling electrical current is the alternating electrical current including the signal component whose frequency is same as or synchronized with the resonance frequency of the mirror 130. However, the mirror 130 may rotate around the rotational axis which is the axis along the Y axis direction at a frequency which is different from or is not synchronized with the resonance frequency which is determined by the mirror 130 and the torsion bars 120a and 120b. In this case, the controlling electrical current is an alternating electrical current including a signal component whose frequency is same as or synchronized with the frequency at which the mirror 130 rotates around the rotational axis which is the Y axis direction.

On the other hand, a magnetic field is applied to the coil 140 from the magnets 151 and 152. Incidentally, it is preferable that the magnets 151 and 152 apply the magnetic field to the two sides of the coil 140 which face to each other along the X axis direction. In this case, the magnets 151 and 152 may not apply the magnetic field to the two sides of the coil 140 which face to each other along the Y axis direction. Alternatively, the magnets 151 and 152 may apply the magnetic field to the two sides of the coil 140 which face to each other along the Y axis direction. Alternatively, the magnets 151 and 152 may apply a leakage flux of the magnetic field, which is applied to the two sides of the coil 140 which face to each other along the Y axis direction, to the two sides of the coil 140 which face to each other along the Y axis direction.

Therefore, a Lorentz force due to an electromagnetic interaction between the controlling electrical current which is supplied to the coil 140 and the magnetic field which is applied to the coil 140 is generated at the coil 140.

Here, as illustrated in FIG. 2(a), a condition in which the controlling electrical current flowing along a clockwise direction in FIG. 2(a) is supplied to the coil 140 and the magnetic field traveling from the magnet 152 to the magnet 151 is applied to the coil 140 will be explained. In this case, as illustrated in FIG. 2(b) which is a drawing obtained by observing the MEMS scanner 101 illustrated in FIG. 2(a) from a direction of an arrow II, the Lorentz force which acts toward a downward direction in FIG. 2(b) is generated at the right (namely, outer in FIG. 2(a)) long side among the two long side of the coil 140 which face to each other along the X axis direction. Similarly, as illustrated in FIG. 2(b), the Lorentz force which acts toward a upward direction in FIG. 2(b) is generated at the left (namely, inner in FIG. 2(a)) long side among the two long side of the coil 140 which face to each other along the X axis direction. Namely, the Lorentz forces which acts toward the different directions are generated at the two long side of the coil 140 which face to each other along the X axis direction. In other words, the Lorentz forces which are a couple of force are generated at the two long side of the coil 140 which face to each other along the X axis direction. Therefore, the coil 140 rotates towards the clockwise direction in FIG. 2(b).

On the other hand, a condition in which the controlling electrical current flowing along a counterclockwise direction in FIG. 3(a) is supplied to the coil 140 and the magnetic field traveling from the magnet 152 to the magnet 151 is applied to the coil 140 follows after the condition illustrated in FIG. 2(a), because the controlling electrical current is the alternating electrical current. In this case, as illustrated in FIG. 3(b) which is a drawing obtained by observing the MEMS scanner 101 illustrated in FIG. 3(a) from a direction of an arrow III, the Lorentz force which acts toward the upward direction in FIG. 3(b) is generated at the right (namely, outer in FIG. 3(a)) long side among the two long side of the coil 140 which face to each other along the X axis direction. Similarly, as illustrated in FIG. 3(b), the Lorentz force which acts toward the downward direction in FIG. 3(b) is generated at the left (namely, inner in FIG. 3(a)) long side among the two long side of the coil 140 which face to each other along the X axis direction. Namely, the Lorentz forces which acts toward the different directions are generated at the two long side of the coil 140 which face to each other along the X axis direction. In other words, the Lorentz forces which are a couple of force are generated at the two long side of the coil 140 which face to each other along the X axis direction. Therefore, the coil 140 rotates towards the counterclockwise direction in FIG. 3(b).

The coil 140 rotates around the rotational axis which is the axis along the Y axis direction (more specifically, repeats a reciprocating operation of the rotation) by the Lorentz force. The rotational axis of the coil 140 along the Y axis direction is different from the rotational axis of the mirror 130 along the Y axis direction. Specifically, the rotational axis of the coil 140 along the Y axis direction exists at a position which is shifted by a predetermined distance along the X axis direction from the rotational axis of the mirror 130 along the Y axis direction. Thus, the rotation of the coil 140 around the rotational axis which is the axis along the Y axis direction does not directly rotates the mirror 140 around the rotational axis which is the axis along the Y axis direction.

On the other hand, a micro vibration propagates from the coil 140 to the base 110 along with the rotation of the coil 140 around the rotational axis which is the axis along the Y axis direction. As a result, the base 110 on which the coil 140 is disposed vibrates and deforms in a shape of stationary wave (namely, in a waveform shape of the stationary wave) along the X axis direction. In other words, the base 110 vibrates and deforms to wave along the X axis direction. Namely, the base 110 deforms its external appearance such that its one portion becomes an antinode of the deformational vibration and its another portion becomes a node of the deformational vibration.

The mirror 130 rotates around the rotational axis which is the axis along the Y axis direction due to the deformational vibration of the base 110. The mirror 130 rotates to resonate at the resonance frequency (for example, 20 kHz) which is determined by the mirror 130 and the torsion bars 120a and 120b. For example, if the inertia moment, which is around the axis along the Y axis, of the mirror 130 is I and the torsion spring constant of the torsion bars 120a and 120b on the assumption that the torsion bars 120a and 120b are regarded as one spring is k, then, the mirror 130 rotates around the rotational axis which is the axis along the Y axis direction to resonate at the resonance frequency specified by $(1/(2\pi)) \times \sqrt{(k/I)}$ (or the resonance frequency which is N multiple or 1/N multiple of $(1/(2\pi)) \times \sqrt{(k/I)}$ (where N is an integral number of 1 or more)).

Here, with reference to FIG. 4, a relationship among the rotation of the coil 140 around the rotational axis which is the axis along the Y axis direction, the deformational vibration of the base 110 along the X axis direction and the rotation of the mirror 130 around the rotational axis which is the axis along the Y axis direction will be explained in detail.

As illustrated in FIG. 4(a), in the condition that the coil 140 does not rotate around the rotational axis which is the axis along the Y axis direction, the base 110 does not vibrate and deform along the X axis direction. Thus, the mirror 130 does not rotate around the rotational axis which is the axis along the Y axis direction, either.

Then, as illustrated in FIG. 4(b), when the coil 140 starts to rotate toward the counterclockwise direction in FIG. 4(b) around the rotational axis which is the axis along the Y axis direction, the base 110 starts to vibrate and deform along the X axis direction such that a portion corresponding to the rotational axis of the coil 140 along the Y axis direction (namely, a portion which is located on the rotational axis of the coil 140 along the Y axis direction) becomes the node. In addition, the base 110 starts to vibrate and deform along the X axis direction such that a portion corresponding to the rotational axis of the mirror 130 along the Y axis direction (namely, a portion which is located on the rotational axis of the mirror 130 along the Y axis direction) becomes the node. In other words, the base 110 starts to vibrate and deform along the X axis direction such that the antinode exists between the portion corresponding to the rotational axis of the coil 140 along the Y axis direction and the portion corresponding to the rotational axis of the mirror 130 along the Y axis direction. Namely, the node and the antinode appear along the X axis direction due to the deformational vibration of the base 110. Incidentally, the positions of the node and the antinode are substantially fixed, because the deformational vibration of the base 110 is performed in accordance with the waveform of the so-called stationary wave. The frequency of the deformational vibration of the base 110 is typically same as the above described resonance frequency of the mirror 130.

A stiffness of the base 110 may be adjusted in order to realize the above described deformational vibration of the base 110. For example, the stiffness of a portion of the base 110 which becomes the node may be relatively large and the stiffness of a portion of the base 110 which becomes the antinode may be relatively small. More specifically, a rib may be formed on the portion of the base 110 which becomes the node and the rib may not be formed on the portion of the base 110 which becomes the antinode. In this case, a portion of the base 110 on which the rib is formed is hard to bend because its stiffness is relatively large while a portion of the base 110 on which the rib is not formed is easy to bend because its stiffness is relatively small. As a result, the base 110 vibrates and deforms to wave along the X axis direction such that the portion on which the rib is formed becomes the node and the portion on which the rib is not formed becomes the antinode.

As a result, as illustrated in FIG. 4(a) to FIG. 4(g) in a chronological order, the base 110 vibrates and deforms to have the appearance of the stationary wave along with the rotation of the coil 140. Namely, the base 110 has such an appearance that the stationary wave appears along the direction (namely, the X axis direction) which is perpendicular to the rotational axis of the mirror 130. As a result, as illustrated in FIG. 4(a) to FIG. 4(g) in a chronological order, the mirror 130 rotates around the rotational axis which is the axis along the Y axis direction along with the deformational vibration of the base 110.

Incidentally, as illustrated in FIG. 4(a) to FIG. 4(g), the rotational direction of the coil 140 and the rotational direction of the mirror 130 are typically opposite to each other. Specifically, as illustrated in FIG. 4(a) to FIG. 4(c), if the coil 140 rotates toward the counterclockwise direction, the mirror 130 rotates toward the clockwise direction. Similarly, as illustrated in FIG. 4(c) to FIG. 4(g), if the coil 140 rotates toward the clockwise direction, the mirror 130 rotates toward the counterclockwise direction. Incidentally, the coil 140, the base 110 and the mirror 130 which are in a condition illustrated in FIG. 4(g) transits to a condition illustrated in FIG. 4(a) after transiting to a condition illustrated in FIG. 4(f). After that, the coil 140, the base 110 and the mirror 130 vibrate and deform or rotate in accordance with the chronological order illustrated in FIG. 4(a) to FIG. 4(g). However, a deformational mode illustrated in FIG. 4(a) to FIG. 4(g) is one example, and the base 110 may vibrates and deforms in another deformational mode (for example, a deformational mode having more nodes).

Moreover, FIG. 4(a) to FIG. 4(g) illustrates an example in which the rotational direction of the coil 140 and the rotational direction of the mirror 130 are opposite to each other. This example may be expressed as an example in which the rotational direction of the coil 140 and the rotational direction of a portion of the base 110 which supports the mirror 130 are opposite to each other, in a strict sense.

However, if the base 110 vibrates and deforms in a higher order deformational mode (for example a deformational mode by which the numbers of the nodes and the antinodes increase compared to the condition illustrated in FIG. 4(a) to FIG. 4(g)), the rotational direction of the mirror 130 and the rotational direction of the portion of the base 110 which supports the mirror 130 may be opposite to each other. Namely, the rotational direction of the coil 140 and the rotational direction of the mirror 130 may be same to each other.

As explained above, the MEMS scanner 101 in the first example is capable of rotating the mirror 130 around the rotational axis which is the axis along the Y axis direction. Namely, the MEMS scanner 101 in the first example is capable of driving the mirror 130 along a single axis.

In addition, in the MEMS scanner 101 in the first example, the mirror 130 is located on the outside of the winding of the coil 140. Therefore, the coil 140 need not be disposed to surround the mirror 140. As a result, it is possible to relatively decrease a size of the coil 140 (for example, a radius of the winding, a length of the winding or the like), compared to a MEMS scanner in a comparative example in which the coil 140 is disposed to surround the mirror 130. In other word, in the first example, it is possible to relatively decrease the size of the coil 140 regardless of a size of the mirror 130. As a result, it is also possible to relatively decrease a size of the magnets 151 and 152 which are to apply the magnetic field to the coil 140. Thus, in the first example, it is possible to decrease a magnetic gap between the coil 140 and the magnets 151 and 152 regardless of the size of the mirror 130, compared to the MEMS scanner in the comparative example in which the coil 140 is disposed to surround the mirror 130. Therefore, in the first example, a downsizing of the MEMS scanner 101 is capable of being realized appropriately, compared to the MEMS scanner in the comparative example in which the coil 140 is disposed to surround the mirror 130.

In addition, in the first example, the coil 140 need not be disposed to surround the mirror 130. Thus, a flexibility of an arrangement of the magnets 151 and 152 becomes relatively high, compared to the MEMS scanner in the comparative example in which the coil 140 is disposed to surround the mirror 130. Thus, the magnets 151 and 152 are capable of being disposed at an upside of a center of the coil 140 (specifically, an upside of the inside of the winding of the coil 140). Especially, even if the magnets 151 and 152 are disposed at the upside of the center of the coil 140, the magnets 151 and 152 do not interrupt the light path on the upside of the mirror 130. Therefore, the flexibility of the arrangement of the magnets 151 and 152 becomes relatively high, while an appropriate operation as the MEMS scanner 101 is maintained.

In addition, in the first example, the torsion bars 120*a* and 120*b* which connect to the mirror 130 are connected to the position which corresponds to the node of the deformational vibration of the base 110. Namely, the position which corresponds to the node of the deformational vibration of the base 110 corresponds to the rotational axis of the mirror 130 along the Y axis direction. Moreover, the coil 140 is disposed at the position which corresponds to the node of the deformational vibration of the base 110. Namely, the position which corresponds to the node of the deformational vibration of the base 110 corresponds to the rotational axis of the coil 140 along the Y axis direction. Thus, in the first example, a movement of the mirror 130 and the coil 140 along a vertical direction (specifically, a direction which is perpendicular to each of the X axis direction and the Y axis direction and a direction which is perpendicular to a surface of the base 110) is capable of being prevented. Therefore, a high accurate rotation of the mirror 130 is capable of being realized.

Incidentally, the Lorentz force which is generated at the coil 140 may propagate as a "micro vibration (namely, a non-directional force and a force which does not act to directly twisting the torsion bars 120*a* and 120*b* toward the rotational direction of the mirror 130)", as disclosed in Japanese Patent Publication No. 4827993. In this case, the Lorentz force propagates as the micro vibration to the base 100 and thus the base 110 vibrates and deforms. Namely, the Lorentz force which is the micro vibration appears as the deformational vibration of the base 110. Alternatively, the Lorentz force which is generated at the coil 140 may propagate as a "Lamb wave", as disclosed in an internet website of National Institute of Advanced Industrial Science and Technology (http://www.aist.go.jp/aist_j/press_release/pr2010/pr20100209/pr20100209.html). In this case, the Lorentz force propagates as the Lamb wave to the base 100 and thus the base 110 vibrates and deforms. Same applies to the below described a second example to a sixth example.

(2) Second Example

Next, with reference to FIG. 5 to FIG. 8, a second example of the MEMS scanner will be explained. Incidentally, regarding a feature which is same as the feature of the above described MEMS scanner 101 in the first example, same reference number is added and its explanation will be omitted.

(2-1) Configuration of MEMS Scanner

Firstly, with reference to FIG. 5, a configuration of a MEMS scanner 102 in the second example will be explained. FIG. 5 is a plan view conceptually illustrating the configuration of the MEMS scanner 102 in the second example.

As illustrated in FIG. 5, the MEMS scanner 102 in the second example is provided with: a first base 110-1; a first torsion bar 120*a*-1; a first torsion bar 120*b*-1; a second base 110-2; a second torsion bar 120*a*-2; a second torsion bar 120*b*-2; a mirror 130; a coil 140; magnets 151 and 152; and magnets 161 and 162.

The first base 110-1 has a frame shape with a space therein. Namely, the first base 110-1 has a frame shape having two sides extending along a Y axis direction in FIG. 5 and two sides extending along a X axis direction (i.e. a direction perpendicular to the Y axis direction) in FIG. 5 and having a space surrounded by the two sides extending along the Y axis direction and the two sides extending along the X axis direction. In an example illustrated in FIG. 5, the first base 110-1 has, but not limited to, a square shape. For example, the first base 110-1 may have another shape (e.g. rectangular shape such as an oblong, a circular shape, or the like). Moreover, the first base 110-1 is a structure which is the foundation of the MEMS scanner 102 in the second example and is preferably fixed to a not-illustrated substrate or support member (in other words, is fixed in the inside of a system which is the MEMS scanner 102). Alternatively, the first base 110-1 may be suspended by a not-illustrated suspension or the like.

Incidentally, FIG. 5 illustrates the example in which the first base 110-1 has the frame shape, but obviously the first base 110-1 may have another shape. For example, the first base 110-1 may have a U shape in which one portion of the sides is open. Alternatively, for example, the first base 110-1 may have a box shape with a space therein. In other words, the first base 110-1 may have a box shape having two surfaces distributed on a plane defined by the X axis and the Y axis, two surfaces distributed on a plane defined by the X axis and the not-illustrated Z axis (i.e. the axis perpendicular to both of the X axis and the Y axis), and two surfaces distributed on a plane defined by the Y axis and the not-illustrated Z axis, and having a space surrounded by the six surfaces. Alternatively, the shape of the first base 110-1 may be arbitrarily changed depending on an arrangement aspect of the mirror 130.

Each of the first torsion bars 120*a*-1 and 120*b*-1 is, for example, an elastic member such as a spring made of silicone, copper alloy, iron-based alloy, other metal, resin, or the like. Each of the first torsion bars 120*a*-1 and 120*b*-1 is disposed to extend along the X axis direction in FIG. 5. In other words, each of the first torsion bars 120*a*-1 and 120*b*-1 has a shape having a long side extending along the X axis direction and a short side extending along the Y axis direction. However, in accordance with a setting situation of a resonance frequency described later, each of the first torsion bars 120*a*-1 and 120*b*-1 may have a shape having a short side extending along the X axis direction and a long side extending along the Y axis direction. One end of each of the first torsion bars 120*a*-1 and 120*b*-1 is connected to the first base 110-1. The other end of each of the first torsion bars 120*a*-1 and 120*b*-1 is connected to the second base 110-2. Namely, the first torsion bars 120*a*-1 and 120*b*-1 suspends the second base 110-2 such that the second base 110-2 is inserted therebetween.

The second base 110-2 has a frame shape with a space therein. Namely, the second base 110-2 has a frame shape having two sides extending along the Y axis direction in FIG. 5 and two sides extending along the X axis direction in FIG. 5 and having a space surrounded by the two sides extending along the Y axis direction and the two sides extending along the X axis direction. In an example illustrated in FIG. 5, the second base 110-2 has, but not limited to, a square shape. For example, the first base 110-1 may have another shape (e.g. rectangular shape such as an oblong, a circular shape, or the like).

Moreover, the second base 110-2 is disposed in the space in the inside of the first base 110-1 to be suspended or supported by the first torsion bars 120*a*-1 and 120*b*-1. The second base 110-2 is configured to rotate around a rotational axis which is an axis along the X axis direction, by the elasticity of the first torsion bars 120*a*-1 and 120*b*-1.

Incidentally, FIG. 5 illustrates the example in which the second base 110-2 has the frame shape, but obviously the second base 110-2 may have another shape. For example, the second base 110-2 may have a U shape in which one portion of the sides is open. Alternatively, for example, the second base 110-2 may have a box shape with a space therein. In other words, the second base 110-2 may have a box shape having two surfaces distributed on a plane defined by the X axis and the Y axis, two surfaces distributed on a plane defined by the X axis and the not-illustrated Z axis (i.e. the axis perpendicular to both of the X axis and the Y axis), and two surfaces distributed on a plane defined by the Y axis and the not-illustrated Z axis, and having a space surrounded by the six surfaces. Alternatively, the shape of the second base 110-2 may be arbitrarily changed depending on an arrangement aspect of the mirror 130.

Each of the second torsion bars 120a-2 and 120b-2 is, for example, an elastic member such as a spring made of silicone, copper alloy, iron-based alloy, other metal, resin, or the like. Each of the second torsion bars 120a-2 and 120b-2 is disposed to extend along the Y axis direction in FIG. 5. In other words, each of the second torsion bars 120a-2 and 120b-2 has a shape having a long side extending along the Y axis direction and a short side extending along the X axis direction. However, in accordance with a setting situation of a resonance frequency described later, each of the second torsion bars 120a-2 and 120b-2 may have a shape having a short side extending along the Y axis direction and a long side extending along the X axis direction. One end of each of the second torsion bars 120a-2 and 120b-2 is connected to the second base 110-2. The other end of each of the second torsion bars 120a-2 and 120b-2 is connected to the mirror 130. Namely, the 15 second torsion bars 120a-2 and 120b-2 suspends the mirror 130 such that the mirror 130 is inserted therebetween.

The mirror 130 is disposed in the space in the inside of the second base 110-2 to be suspended or supported by the second torsion bars 120a-2 and 120b-2. The mirror 130 is configured to rotate around a rotational axis which is an axis along the Y axis direction, by the elasticity of the second torsion bars 120a-2 and 120b-2.

The coil 140 is a plurality of windings which are made of a material (for example, a gold, a cupper or the like) whose electrical conductivity is relatively large for example. In the first example, the coil 140 has a rectangular shape. Especially, lengths of four sides of the coil 140 are substantially same. Namely, the coil 140 has a square shape. However, the coil 140 has an arbitrary shape (for example, an oblong shape, a diamond shape, a parallelogram, a circular shape, an ellipsoidal shape or another arbitrary loop shape).

The coil 140 is disposed on the second base 110-2. Especially, the coil 140 is disposed on the second base 110-2 such that the coil 140 is located (especially, a center or a gravity center of the coil 140 is located) on a position which is shifted by a predetermined distance along the X axis direction (namely, the direction which is perpendicular to the direction of the rotational axis of the mirror 130) from a position where the mirror 130 is disposed (especially, a center or a gravity center of the mirror 130 is disposed). However, the coil 140 may be disposed on the second base 110-2 such that the coil 140 is located on a position which is shifted by a predetermined distance along the Y axis direction (namely, the direction of the rotational axis of the mirror 130) from a position where the mirror 130 is disposed. In addition, the coil 140 is disposed on the second base 110-2 such that the mirror 130 and the coil 140 align along the X axis direction. As a result, the mirror 130 is located on an outside of the winding which constitutes the coil 140. In other words, the mirror 130 is not located on an inside of the winding which constitutes the coil 140.

A controlling electrical current for rotating the mirror 130 and the second base 110-2 is supplied from a power source to the coil 140 via a supply terminals 141 which are formed on the second base 110-2. The controlling electrical current is typically an alternating electrical current including a signal component whose frequency is same as or synchronized with a frequency at which the mirror 130 rotates around the rotational axis which is an axis along the Y axis direction and a signal component whose frequency is same as or synchronized with a frequency at which the second base 110-2 rotates around the rotational axis which is an axis along the X axis direction. Incidentally, the power source may be a power source with which the MEMS scanner 102 itself is provided or a power source which is equipped on an outside of the MEMS scanner 102. Incidentally, in the following explanation, for the purpose of the clarification of the explanation, an electrical current component for rotating the mirror 130 around the rotational axis which is the axis along the Y axis direction is referred to as a "controlling electrical current for Y axis driving". Similarly, an electrical current component for rotating the second base 110-2 around the rotational axis which is the axis along the X axis direction is referred to as a "controlling electrical current for X axis driving"

The magnets 151 and 152 are disposed such that the magnets 151 and 152 align along the X axis direction. Especially, the magnets 151 and 152 are disposed such that the coil 140 is inserted between the magnets 151 and 152 along the X axis direction. In addition, one of the magnets 151 and 152 is an output-side of a magnetic flux and the other one of the magnets 151 and 152 is an input-side of the magnetic flux. Incidentally, hereinafter, an example in which the magnet 151 is the input-side of the magnetic flux and the magnet 152 is the output-side of the magnetic flux will be explained.

Incidentally, a magnetic field which is applied from the magnets 151 and 152 is mainly used to rotate the mirror 130 around the rotational axis which is the axis along the Y axis direction. Thus, for the purpose of the clarification of the explanation, the magnetic field which is applied from the magnets 151 and 152 (namely, the magnetic field for rotating the mirror 130 around the rotational axis which is the axis along the Y axis direction) is referred to as a "magnetic field for Y axis driving".

The magnets 161 and 162 are disposed such that the magnets 161 and 162 align along the Y axis direction. Especially, the magnets 161 and 162 are disposed such that the coil 140 is inserted between the magnets 161 and 162 along the Y axis direction. In addition, one of the magnets 161 and 162 is an output-side of a magnetic flux and the other one of the magnets 161 and 162 is an input-side of the magnetic flux. Incidentally, hereinafter, an example in which the magnet 161 is the output-side of the magnetic flux and the magnet 162 is the input-side of the magnetic flux will be explained.

Incidentally, a magnetic field which is applied from the magnets 161 and 162 is mainly used to rotate the second base 110-2 around the rotational axis which is the axis along the X axis direction. Thus, for the purpose of the clarification of the explanation, the magnetic field which is applied from the magnets 161 and 162 (namely, the magnetic field for rotating the second base 110-2 around the rotational axis which is the axis along the X axis direction) is referred to as a "magnetic field for X axis driving".

(2-2) Operation of MEMS Scanner

Next, with reference to FIG. 6 to FIG. 8, an explanation will be given to an aspect of the operation of the MEMS scanner 102 in the second example (specifically, an aspect of the operation of rotating the mirror 130). FIG. 6 are plan view and cross-sectional view conceptually illustrating an aspect of the operation performed by the MEMS scanner 102 in the second example. FIG. 7 are plan view and cross-sectional view conceptually illustrating an aspect of the operation performed by the MEMS scanner 102 in the second example. FIG. 8 are cross-sectional views conceptually illustrating an aspect of the operation performed by the MEMS scanner 102 in the second example.

In operation of the MEMS scanner 102 in the second example, firstly, the controlling electrical current is supplied to the coil 140. The controlling electrical current includes an electrical current component (namely, the controlling electrical current for X axis driving) for rotating the second base 110-2 around the rotational axis which is the axis along the X axis direction. In the second example, the second base 110-2 rotates around the rotational axis which is the axis along the X axis direction at an arbitrary frequency (for example, 60 Hz). Therefore, the controlling electrical current for X axis driving is the alternating electrical current including the signal component whose frequency is same as or synchronized with the frequency of the rotation of the second base 110-2 around the rotational axis which is the axis along the X axis direction. However, the second base 110-2 may rotate around the rotational axis which is the axis along the X axis direction at a resonance frequency which is determined by a suspended portion including the second base 110-2 (namely, a suspended portion including the second base 110-2, the second torsion bars 120a-2 and 120b-2 and the mirror 130) and the first torsion bars 120a-1 and 120b-1 (more specifically, a resonance frequency which is determined by an inertial moment of the suspended portion including the second base 110-2 and a torsion spring constant of the first torsion bars 120a-1 and 120b-1).

On the other hand, the magnetic field for X axis driving is applied to the coil 140 from the magnets 161 and 162. Incidentally, it is preferable that the magnets 161 and 162 apply the magnetic field for X axis driving to the two sides of the coil 140 which face to each other along the Y axis direction. In this case, the magnets 161 and 162 may not apply the magnetic field for X axis driving to the two sides of the coil 140 which face to each other along the X axis direction. Alternatively, the magnets 161 and 162 may apply the magnetic field for X axis driving to the two sides of the coil 140 which face to each other along the X axis direction. Alternatively, the magnets 161 and 162 may apply a leakage flux of the magnetic field for X axis driving to the two sides of the coil 140 which face to each other along the X axis direction.

Therefore, a Lorentz force due to an electromagnetic interaction between the controlling electrical current for X axis driving which is supplied to the coil 140 and the magnetic field for X axis driving which is applied to the coil 140 is generated at the coil 140.

Here, as illustrated in FIG. 6(a), a condition in which the controlling electrical current for X axis driving flowing along a clockwise direction in FIG. 6(a) is supplied to the coil 140 and the magnetic field for X axis driving traveling from the magnet 161 to the magnet 162 is applied to the coil 140 will be explained. In this case, as illustrated in FIG. 6(b) which is a drawing obtained by observing the MEMS scanner 102 illustrated in FIG. 6(a) from a direction of an arrow VI, the Lorentz force which acts toward a upward direction in FIG. 6(b) is generated at the right (namely, upper in FIG. 6(a)) side among the two side of the coil 140 which face to each other along the Y axis direction. Similarly, as illustrated in FIG. 6(b), the Lorentz force which acts toward a downward direction in FIG. 6(b) is generated at the left (namely, lower in FIG. 6(a)) side among the two side of the coil 140 which face to each other along the Y axis direction. Namely, the Lorentz forces which acts toward the different directions are generated at the two side of the coil 140 which face to each other along the Y axis direction. In other words, the Lorentz forces which are a couple of force are generated at the two side of the coil 140 which face to each other along the Y axis direction. Therefore, the coil 140 rotates towards the counterclockwise direction in FIG. 6(b).

On the other hand, a condition in which the controlling electrical current for X axis driving flowing along a counterclockwise direction in FIG. 7(a) is supplied to the coil 140 and the magnetic field for X axis driving traveling from the magnet 161 to the magnet 162 is applied to the coil 140 follows after the condition illustrated in FIG. 6(a), because the controlling electrical current for X axis driving is the alternating electrical current. In this case, as illustrated in FIG. 7(b) which is a drawing obtained by observing the MEMS scanner 102 illustrated in FIG. 7(a) from a direction of an arrow VII, the Lorentz force which acts toward the downward direction in FIG. 7(b) is generated at the right (namely, upper in FIG. 6(a)) side among the two side of the coil 140 which face to each other along the Y axis direction. Similarly, as illustrated in FIG. 7(b), the Lorentz force which acts toward the upward direction in FIG. 7(b) is generated at the left (namely, lower in FIG. 7(a)) side among the two side of the coil 140 which face to each other along the Y axis direction. Namely, the Lorentz forces which acts toward the different directions are generated at the two side of the coil 140 which face to each other along the Y axis direction. In other words, the Lorentz forces which are a couple of force are generated at the two side of the coil 140 which face to each other along the Y axis direction. Therefore, the coil 140 rotates towards the clockwise direction in FIG. 7(b).

The coil 140 rotates around the rotational axis which is the axis along the X axis direction (more specifically, repeats a reciprocating operation of the rotation) by the Lorentz force. The rotational axis of the coil 140 along the X axis direction overlaps with the rotational axis of the second base 110-2 along the X axis direction. Therefore, the second base 110-2 also rotates around the rotational axis which is the axis along the X axis along with the rotation of the coil 140 around the rotational axis which is the axis along the X axis.

In addition, the second base 110-2 supports the mirror 130 via the second torsion bars 120a-2 and 120b-2. Thus, the mirror 130 also rotates around the rotational axis which is the axis along the X axis along with the rotation of the second base 110-2 around the rotational axis which is the axis along the X axis.

Here, with reference to FIG. 8, a relationship among the rotation of the coil 140 around the rotational axis which is the axis along the X axis direction, the rotation of the second base 110-2 around the rotational axis which is the axis along the X axis and the rotation of the mirror 130 around the rotational axis which is the axis along the X axis direction will be explained in detail.

As illustrated in FIG. 8(a), in the condition that the coil 140 does not rotate around the rotational axis which is the axis along the X axis direction, the second base 110-2 does not rotate around the rotational axis which is the axis along the X axis direction either. Thus, the mirror 130 does not rotate around the rotational axis which is the axis along the X axis direction, either.

Then, as illustrated in FIG. 8(b), when the coil 140 starts to rotate toward the counterclockwise direction in FIG. 8(b)

around the rotational axis which is the axis along the X axis direction, the second base 110-2 also starts to rotate toward the counterclockwise direction in FIG. 8(*b*) around the rotational axis which is the axis along the X axis direction. As a result, as illustrated in FIG. 8(*a*) to FIG. 8(*g*) in a chronological order, the second base 110-2 also rotates around the rotational axis which is the axis along the X axis along with the rotation of the coil 140 around the rotational axis which is the axis along the X axis. Thus, as illustrated in FIG. 8(*a*) to FIG. 8(*g*) in a chronological order, the mirror 130 also rotates around the rotational axis which is the axis along the X axis along with the rotation of the second base 110-2 around the rotational axis which is the axis along the X axis. Incidentally, the coil 140, the second base 110-2 and the mirror 130 which are in a condition illustrated in FIG. 8(*g*) transits to a condition illustrated in FIG. 8(*a*) after transiting to a condition illustrated in FIG. 8(*f*). After that, the coil 140, the second base 110-2 and the mirror 130 rotate in accordance with the chronological order illustrated in FIG. 8(*a*) to FIG. 8(*g*). However, a deformational mode illustrated in FIG. 4(*a*) to FIG. 4(*g*) is one example, and the base 110 may vibrates and deforms in another deformational mode (for example, a deformational mode having more nodes).

On the other hand, the controlling electrical current includes an electrical current component (namely, the controlling electrical current for Y axis driving) for rotating the mirror 130 around the rotational axis which is the axis along the Y axis direction. In the second example, the mirror 130 rotates around the rotational axis which is the axis along the Y axis direction to resonate at a resonance frequency which is determined by the mirror 130 and the second torsion bars 120*a*-2 and 120*b*-2 (more specifically, an inertial moment of the mirror 130 and a torsion spring constant of the second torsion bars 120*a*-2 and 120*b*-2). Therefore, the controlling electrical current for Y axis driving is an alternating electrical current including the signal component whose frequency is same as or synchronized with the resonance frequency of the mirror 130. However, the mirror 130 may rotate around the rotational axis which is the axis along the Y axis direction at a frequency which is different from or is not synchronized with the resonance frequency which is determined by the mirror 130 and the second torsion bars 120*a*-2 and 120*b*-2. In this case, the controlling electrical current for Y axis driving is an alternating electrical current including a signal component whose frequency is same as or synchronized with the frequency at which the mirror 130 rotates around the rotational axis which is the Y axis direction.

On the other hand, the magnetic field for Y axis driving is applied to the coil 140 from the magnets 151 and 152. Incidentally it is preferable that the magnets 151 and 152 apply the magnetic field for Y axis driving to the two sides of the coil 140 which face to each other along the X axis direction. In this case, the magnets 151 and 152 may not apply the magnetic field for Y axis driving to the two sides of the coil 140 which face to each other along the Y axis direction. Alternatively, the magnets 151 and 152 may apply the magnetic field for Y axis driving to the two sides of the coil 140 which face to each other along the Y axis direction. Alternatively, the magnets 151 and 152 may apply a leakage flux of the magnetic field for Y axis driving to the two sides of the coil 140 which face to each other along the Y axis direction.

Therefore, a Lorentz force due to an electromagnetic interaction between the controlling electrical current for Y axis driving which is supplied to the coil 140 and the magnetic field for Y axis driving which is applied to the coil 140 is generated at the coil 140.

In this case, the coil 140 rotates around the rotational axis which is the axis along the Y axis direction (more specifically, repeats a reciprocating operation of the rotation) by the Lorentz force. The rotational axis of the coil 140 along the Y axis direction is different from the rotational axis of the mirror 130 along the Y axis direction. Specifically, the rotational axis of the coil 140 along the Y axis direction exists at a position which is shifted by a predetermined distance along the X axis direction from the rotational axis of the mirror 130 along the Y axis direction. Thus, the rotation of the coil 140 around the rotational axis which is the axis along the Y axis direction does not directly rotates the mirror 140 around the rotational axis which is the axis along the Y axis direction.

On the other hand, a micro vibration propagates from the coil 140 to the second base 110-2 along with the rotation of the coil 140 around the rotational axis which is the axis along the Y axis direction. As a result, the second base 110-2 on which the coil 140 is disposed vibrates and deforms in a shape of stationary wave (namely, in a waveform shape of the stationary wave) along the X axis direction. In other words, the second base 110-2 vibrates and deforms to wave along the X axis direction. Namely, the second base 110-2 deforms its external appearance such that its one portion becomes an antinode of the deformational vibration and its another portion becomes a node of the deformational vibration.

The mirror 130 rotates around the rotational axis which is the axis along the Y axis direction due to the deformational vibration of the second base 110-2. The mirror 130 rotates to resonate at the resonance frequency (for example, 20 kHz) which is determined by the mirror 130 and the second torsion bars 120*a*-2 and 120*b*-2. For example, if the inertia moment, which is around the axis along the Y axis, of the mirror 130 is I(Y) and the torsion spring constant of the second torsion bars 120*a*-2 and 120*b*-2 on the assumption that the second torsion bars 120*a*-2 and 120*b*-2 are regarded as one spring is k(Y), then, the mirror 130 rotates around the rotational axis which is the axis along the Y axis direction to resonate at the resonance frequency specified by $(1/(2\pi))\times\sqrt{(k(Y)/I(Y))}$ (or the resonance frequency which is N multiple or 1/N multiple of $(1/(2\pi))\times\sqrt{(k(Y)/I(Y))}$ (where N is an integral number of 1 or more)).

Incidentally, a relationship among the rotation of the coil 140 around the rotational axis which is the axis along the Y axis direction, the deformational vibration of the second base 110-2 along the X axis direction and the rotation of the mirror 130 around the rotational axis which is the axis along the Y axis direction is same as the relationship among the rotation of the coil 140 around the rotational axis which is the axis along the Y axis direction, the deformational vibration of the base 110 along the X axis direction and the rotation of the mirror 130 around the rotational axis which is the axis along the Y axis direction in the first example.

As explained above, the MEMS scanner 102 in the second example is capable of rotating the mirror 130 around the rotational axis which is the axis along the Y axis direction. In addition, the MEMS scanner 102 in the second example is capable of rotating the second base 110-2 around the rotational axis which is the axis along the X axis direction. The mirror 130 also rotates around the rotational axis which is the axis along the X axis direction along with the rotation of the second base 110-2 around the rotational axis which is the axis along the X axis direction, with considering the fact that the second base 110-2 supports the mirror 130 via the second torsion bars 120*a*-2 and 120*b*-2. Therefore, the MEMS scanner 102 in the second example is capable of rotating the mirror 130 around the rotational axis which is the axis along the X axis direction. Namely, the MEMS scanner 102 in the second example is capable of driving the mirror 130 along two axes.

In addition, in the MEMS scanner 102 in the second example, the mirror 130 is located on the outside of the winding of the coil 140. Therefore, the coil 140 need not be disposed to surround the mirror 140. As a result, it is possible to relatively decrease a size of the coil 140 (for example, a radius of the winding, a length of the winding or the like), compared to a MEMS scanner in a comparative example in which the coil 140 is disposed to surround the mirror 130. In other word, in the second example, it is possible to relatively decrease the size of the coil 140 regardless of a size of the mirror 130. As a result, it is also possible to relatively decrease a size of the magnets 151 and 152 and the magnets 161 and 162 which are to apply the magnetic field to the coil 140. Thus, in the second example, it is possible to decrease a magnetic gap between the coil 140 and the magnets 151 and 152 and the magnets 161 and 162 regardless of the size of the mirror 130, compared to the MEMS scanner in the comparative example in which the coil 140 is disposed to surround the mirror 130. Therefore, in the first example, a downsizing of the MEMS scanner 102 is capable of being realized appropriately, compared to the MEMS scanner in the comparative example in which the coil 140 is disposed to surround the mirror 130.

In addition, in the second example, the second torsion bars 120*a*-2 and 120*b*-2 which connect to the mirror 130 are connected to the position which corresponds to the node of the deformational vibration of the second base 110-2. Namely, the position which corresponds to the node of the deformational vibration of the second base 110-2 corresponds to the rotational axis of the mirror 130 along the Y axis direction. Moreover, the coil 140 is disposed at the position which corresponds to the node of the deformational vibration of the second base 110-2. Namely, the position which corresponds to the node of the deformational vibration of the second base 110-2 corresponds to the rotational axis of the coil 140 along the Y axis direction. Thus, in the second example, a movement of the mirror 130 and the coil 140 along a vertical direction (specifically, a direction which is perpendicular to each of the X axis direction and the Y axis direction and a direction which is perpendicular to a surface of the first base 110-1 or the second base 110-2) is capable of being prevented. Therefore, a high accurate rotation of the mirror 130 is capable of being realized.

(3) Third Example

Next, with reference to FIG. 9 to FIG. 10, a third example of the MEMS scanner will be explained. Incidentally, regarding a feature which is same as the feature of the above described MEMS scanner 102 in the second example, same reference number is added and its explanation will be omitted.

(3-1) Configuration of MEMS Scanner

Firstly, with reference to FIG. 9, a configuration of a MEMS scanner 103 in the third example will be explained. FIG. 9 is a plan view conceptually illustrating the configuration of the MEMS scanner 103 in the third example.

As illustrated in FIG. 9, the MEMS scanner 103 in the third example is different from the MEMS scanner 102 in the second example in that disposing positions of the magnets 161 and 162 are changed and it is not provided with the magnets 151 and 152. Another feature of the MEMS scanner 103 in the third example may be same as another feature of the MEMS scanner 102 in the second example.

In the third example, the magnets 161 and 162 are disposed such that the coil 140 is inserted between the magnets 161 and 162 along the Y axis direction, as with the second example. On the other hand, in the third example, the magnets 161 and 162 are disposed such that the magnet 161 (for example, a center of the magnet 161) and the magnet 162 (for example, a center of the magnet 162) are misaligned (in other words, shifted) along the X axis direction. However, the coil 140 may be inserted between the magnets 161 and 162 along the X axis direction and a position where the magnet 161 is disposed and a position where the magnet 162 is disposed may be shifted along the Y axis direction.

It is preferable that the magnets 161 and 162 be disposed at positions where the magnet 161 and the magnet 162 are symmetry with respect to the coil 140. In other words, it is preferable that the magnets 161 and 162 be disposed at positions where the magnet 161 and the magnet 162 are symmetry with respect to a center point of the windings of the coil 140.

(3-2) Operation of MEMS Scanner

Next, with reference to FIG. 10, an explanation will be given to an aspect of the operation of the MEMS scanner 103 in the third example (specifically, an aspect of the operation of rotating the mirror 130). FIG. 10 is a plan view conceptually illustrating an aspect of the operation performed by the MEMS scanner 103 in the third example.

In operation of the MEMS scanner 103 in the third example, the controlling electrical current (namely, the controlling electrical current including the controlling electrical current for X axis driving and the controlling electrical current for Y axis driving) is supplied to the coil 140, as with the operation of the MEMS scanner 102 in the second example.

On the other hand, the magnetic field is applied to the coil 140 from the magnets 161 and 162. Incidentally, in the third example, the magnetic field which is applied from the magnets 161 and 162 is used not only to rotate the mirror 130 around the rotational axis which is the axis along the Y axis direction but also to rotate the second base 110-2 around the rotational axis which is the axis along the X axis direction.

In this case, as illustrated in FIG. 10, the magnets 161 and 162 apply the magnetic field to two sides of the coil 140 which face to each other along the Y axis direction such that the magnetic field intersects these two sides in a slantwise manner, because the position where the magnet 161 is disposed and the position where the magnet 162 is disposed is shifted along the X axis direction. In other words, the magnets 161 and 162 apply the magnetic field, which intersects these two sides at an angle other than 90 degree angle, to the two sides of the coil 140 which face to each other along the Y axis direction. Namely, the magnets 161 and 162 apply the magnetic field, which intersects a diagonal direction of the windings of the coil 140 with respect to these two sides, to the two sides of the coil 140 which face to each other along the Y axis direction.

In this case, it is preferable that the magnets 161 and 162 do not apply the magnetic field to the two sides of the coil 140 which face to each other along the X axis direction. However, the magnets 161 and 162 may apply only a leakage flux of the magnetic field, which is to be applied to the two sides of the coil 140 which face to each other along the Y axis direction, to the two sides of the coil 140 which face to each other along the X axis direction. Namely, it is preferably that the magnets 161 and 162 do not actively apply the magnetic field to the two sides of the coil 140 which face to each other along the X axis direction. However, the magnets 161 and 162 may actively apply the magnetic field to the two sides of the coil 140 which face to each other along the X axis direction.

Here, as illustrated in FIG. 10, a condition in which the controlling electrical current flowing along a clockwise direction in FIG. 10 is supplied to the coil 140 and the magnetic field traveling from the magnet 161 to the magnet 162 is applied to the coil 140 will be explained. In this case, as illustrated in FIG. 10, the Lorentz force which acts from a back-side of the paper of FIG. 10 to a front-side of the paper is generated at one side (for example, an upper side in FIG. 10) among the two side of the coil 140 which face to each other along the Y axis direction. Here, this Lorentz force is generated at a relatively outer-side (namely, a relatively farther-side from the mirror 130) on the one side among the two sides of the coil 140 which face to each other along the Y axis direction. Similarly, as illustrated in FIG. 10, the Lorentz force which acts from the front-side of the paper of FIG. 10 to the back-side of the paper is generated at the other side (for example, a lower side in FIG. 10) among the two side of the coil 140 which face to each other along the Y axis direction. Here, this Lorentz force is generated at a relatively inner-side (namely, a relatively closer-side to the mirror 130) on the other side among the two sides of the coil 140 which face to each other along the Y axis direction. Incidentally, when a direction (namely, a polarity) of the controlling electrical current which is supplied to the coil 140 inverts, similar Lorentz force is generated (however, its direction inverts).

As a result, a position where the Lorentz force is generated on the one side among the two sides of the coil 140 which face to each other along the Y axis direction and a position where the Lorentz force is generated on the other side among the two sides of the coil 140 which face to each other along the Y axis direction are shifted along the Y axis direction. Thus, the Lorentz force which is generated at the coil 140 (especially, the Lorentz force depending on the controlling electrical current for X axis driving) acts with respect to the coil 140 as a rotational force around the rotational axis which is the axis along the X axis direction. Thus, the coil 140 rotates around the rotational axis which is the axis along the X axis direction. As a result, the second base 110-2 rotates around the rotational axis which is the axis along the X axis direction, as with the second example.

In addition, the rotation of the coil 140 around the rotational axis which is the axis along the X axis direction allows a vibration to propagate to the second base 110-2. The second base 110-2 vibrates and deforms along the X axis direction, as with the second example, due to the vibration. As a result, the mirror 130 rotates around the rotational axis which is the axis along the Y axis direction.

Alternatively, if the controlling electrical current which is supplied to the coil 140 includes the controlling electrical current for Y axis driving, the inventor and the like of the present invention found in his experiment that the Lorentz force depending on the controlling electrical current for Y axis driving was slightly generated at the coil 140 even when the magnetic field was not applied to the two sides of the coil 140 which face to each other along the X axis direction. As a result, the second base 110-2 vibrates and deforms along the X axis direction, as with the second example. As a result, the mirror 130 rotates around the rotational axis which is the axis along the Y axis direction.

Alternatively, as illustrated in FIG. 10, the position where the Lorentz force is generated on the one side among the two sides of the coil 140 which face to each other along the Y axis direction and the position where the Lorentz force is generated on the other side among the two sides of the coil 140 which face to each other along the Y axis direction are shifted along the X axis direction. Thus, the Lorentz force which is generated at the coil 140 (especially, the Lorentz force depending on the controlling electrical current for Y axis driving) acts with respect to the coil 140 as a rotational force around the rotational axis which is the axis along the Y axis direction. Thus, the coil 140 rotates around the rotational axis which is the axis along the Y axis direction, as with the second example. As a result, the second base 110-2 vibrates and deforms along the X axis direction, as with the second example. As a result, the mirror 130 rotates around the rotational axis which is the axis along the Y axis direction.

As explained above, the MEMS scanner 103 in the third example is capable of enjoying various effects which the MEMS scanner 102 in the second example is capable of enjoying. In addition, the MEMS scanner 103 in the third example need not be provided with the magnets 151 and 152, compared to the MEMS scanner 102 in the second example. Thus, a further downsizing of the MEMS scanner 103 is capable of being realized appropriately.

(4) Fourth Example

Next, with reference to FIG. 11 to FIG. 12, a fourth example of the MEMS scanner will be explained. Incidentally, regarding a feature which is same as the feature of the above described MEMS scanner 103 in the third example, same reference number is added and its explanation will be omitted.

(4-1) Configuration of MEMS Scanner

Firstly, with reference to FIG. 11, a configuration of a MEMS scanner 104 in the fourth example will be explained. FIG. 11 is a plan view conceptually illustrating the configuration of the MEMS scanner 104 in the fourth example.

As illustrated in FIG. 11, the MEMS scanner 104 in the fourth example is different from the MEMS scanner 103 in the third example in that it is provided with the magnetic yoke 170. Another feature of the MEMS scanner 104 in the fourth example may be same as another feature of the MEMS scanner 103 in the third example.

In the fourth example, the magnetic yoke 107 forms a path of the magnetic field via which the magnetic field which is outputted from the magnet 161 reaches to the magnet 162 while being applied to two sides of the coil 140 which face to each other along the Y axis direction. Namely, the magnetic yoke 170 has a shape extending from one edge to which the magnetic field, which is outputted from the magnet 161, is inputted to the other edge from which the magnetic field, which is inputted to the magnet 162, is outputted. FIG. 11 illustrates an example in which the magnetic yoke 170 has a shape extending along the X axis direction.

(4-2) Operation of MEMS Scanner

Next, with reference to FIG. 12, an explanation will be given to an aspect of the operation of the MEMS scanner 104 in the fourth example (specifically, an aspect of the operation of rotating the mirror 130). FIG. 12 are plan view and cross-sectional view conceptually illustrating an aspect of the operation performed by the MEMS scanner 104 in the fourth example.

In operation of the MEMS scanner 104 in the fourth example, the controlling electrical current (namely, the controlling electrical current including the controlling electrical current for X axis driving and the controlling electrical current for Y axis driving) is supplied to the coil 140, as with the operation of the MEMS scanner 103 in the third example.

On the other hand, the magnetic field is applied to the coil 140 from the magnets 161 and 162. Incidentally, in the fourth example, the magnetic field which is applied from the magnets 161 and 162 is used not only to rotate the mirror 130 around the rotational axis which is the axis along the Y axis direction but also to rotate the second base 110-2 around the rotational axis which is the axis along the X axis direction.

In this case, as illustrated in the plan view of FIG. 12(a) and the cross-sectional view of FIG. 12(b), the magnets 161 and 162 apply the magnetic field to a side portion which is located at a relatively one-side (for example, a left-side in FIG. 12(a)) of one side (for example, a lower side in FIG. 12(a)) and to a side portion which is located at a relatively other-side (for example, a right-side in FIG. 12(a)) of the other side (for example, an upper side in FIG. 12(a)) among two sides of the coil 140 which face to each other along the Y axis direction, because the position where the magnet 161 is disposed and the position where the magnet 162 is disposed is shifted along the X axis direction and the magnetic yoke 170 which extends along the X axis direction is disposed. Namely, the magnets 161 and 162 apply the magnetic field to the two side portions which are one portion of two sides of the coil 140 which face to each other along the Y axis direction and which face to each other along a diagonal direction (namely, slantwise direction) of the coil 140. In order to apply the above described magnetic field, the magnet 161 and the one edge of the magnetic yoke 170 (namely, the edge to which the magnetic field, which is outputted from the magnet 161, is inputted) are disposed to apply the magnetic field to one side portion among the two side portions of the coil 140 which face to each other along the diagonal direction of the coil 140. Similarly, the magnet 162 and the other edge of the magnetic yoke 170 (namely, the edge from which the magnetic field, which is inputted to the magnet 162, is outputted) are disposed to apply the magnetic field to the other side portion among the two side portions of the coil 140 which face to each other along the diagonal direction of the coil 140.

Here, as illustrated in FIG. 12(a), a condition in which the controlling electrical current flowing along a clockwise direction in FIG. 12(a) is supplied to the coil 140 and the magnetic field traveling from the magnet 161 to the magnet 162 via the magnetic yoke 170 is applied to the coil 140 will be explained. In this case, as illustrated in FIG. 12(a) and FIG. 12(b), the Lorentz force which acts from a back-side of the paper of FIG. 12(a) to a front-side of the paper (in other words, toward an upper direction in FIG. 12(b)) is generated at one side (for example, an upper side in FIG. 12(a) and a right side in FIG. 12(b)) among the two side of the coil 140 which face to each other along the Y axis direction. Here, as illustrated in FIG. 12(a), this Lorentz force is generated at a relatively outer-side (namely, a relatively farther-side from the mirror 130) on the one side among the two sides of the coil 140 which face to each other along the Y axis direction. Similarly, as illustrated in FIG. 12(a) and FIG. 12(b), the Lorentz force which acts from the front-side of the paper of FIG. 12(a) to the back-side of the paper (in other words, toward the lower side in FIG. 12(b)) is generated at the other side (for example, a lower side in FIG. 12(a) and a left side in FIG. 12(b)) among the two side of the coil 140 which face to each other along the Y axis direction. Here, this Lorentz force is generated at a relatively inner-side (namely, a relatively closer-side to the mirror 130) on the other side among the two sides of the coil 140 which face to each other along the Y axis direction. Incidentally, when a direction (namely, a polarity) of the controlling electrical current which is supplied to the coil 140 inverts, similar Lorentz force is generated (however, its direction inverts).

As a result, a position where the Lorentz force is generated on the one side among the two sides of the coil 140 which face to each other along the Y axis direction and a position where the Lorentz force is generated on the other side among the two sides of the coil 140 which face to each other along the Y axis direction are shifted along the Y axis direction. Thus, the Lorentz force which is generated at the coil 140 (especially, the Lorentz force depending on the controlling electrical current for X axis driving) acts with respect to the coil 140 as a rotational force around the rotational axis which is the axis along the X axis direction. Thus, the coil 140 rotates around the rotational axis which is the axis along the X axis direction. As a result, the second base 110-2 rotates around the rotational axis which is the axis along the X axis direction, as with the third example.

In addition, the rotation of the coil 140 around the rotational axis which is the axis along the X axis direction allows a vibration to propagate to the second base 110-2. The second base 110-2 vibrates and deforms along the X axis direction, as with the third example, due to the vibration. As a result, the mirror 130 rotates around the rotational axis which is the axis along the Y axis direction.

Alternatively, if the controlling electrical current which is supplied to the coil 140 includes the controlling electrical current for Y axis driving, the inventor and the like of the present invention found in his experiment that the Lorentz force depending on the controlling electrical current for Y axis driving was slightly generated at the coil 140 even when the magnetic field was not applied to the two sides of the coil 140 which face to each other along the X axis direction. As a result, the second base 110-2 vibrates and deforms along the X axis direction, as with the third example. As a result, the mirror 130 rotates around the rotational axis which is the axis along the Y axis direction.

Alternatively, as illustrated in FIG. 12(a), the position where the Lorentz force is generated on the one side among the two sides of the coil 140 which face to each other along the Y axis direction and the position where the Lorentz force is generated on the other side among the two sides of the coil 140 which face to each other along the Y axis direction are shifted along the X axis direction. Thus, the Lorentz force which is generated at the coil 140 (especially, the Lorentz force depending on the controlling electrical current for Y axis driving) acts with respect to the coil 140 as a rotational force around the rotational axis which is the axis along the Y axis direction. Thus, the coil 140 rotates around the rotational axis which is the axis along the Y axis direction, as with the second example. As a result, the second base 110-2 vibrates and deforms along the X axis direction, as with the third example. As a result, the mirror 130 rotates around the rotational axis which is the axis along the Y axis direction.

As explained above, the MEMS scanner 104 in the fourth example is capable of enjoying various effects which the MEMS scanner 102 in the second example is capable of enjoying. In addition, the MEMS scanner 104 in the fourth example need not be provided with the magnets 151 and 152, compared to the MEMS scanner 102 in the second example. Thus, a further downsizing of the MEMS scanner 104 is capable of being realized appropriately.

(5) Fifth Example

Next, with reference to FIG. 13 to FIG. 14, a fifth example of the MEMS scanner will be explained. Incidentally, regarding a feature which is same as the feature of the above described MEMS scanner 102 in the second example, same reference number is added and its explanation will be omitted.

(5-1) Basic Configuration

Firstly, with reference to FIG. 13, a basic configuration of a MEMS scanner 105 in the fifth example will be explained. FIG. 13 is a plan view conceptually illustrating the basic configuration of the MEMS scanner 105 in the fifth example.

As illustrated in FIG. 13, the MEMS scanner 105 in the fifth example is different from the MEMS scanner 102 in the second example in that a disposing position of the coil 140 is changed and it is not provided with the magnets 151 and 152. Another feature of the MEMS scanner 105 in the fifth example may be same as another feature of the MEMS scanner 102 in the second example.

In the fifth example, the coil 140 is disposed such that the rotational axis of the coil 140 (specifically, the rotational axis along the X axis direction) and the rotational axis of the second base 110-2 (specifically, the rotational axis along the X axis direction) are misaligned (in other words, shifted) along the Y axis direction. In other words, the coil 140 is disposed such that a rotational center of the coil 140, which corresponds to the rotational axis of the coil 140 along the X axis direction, and a rotational center of the second base 110-2, which corresponds to the rotational axis of the second base 110-2 along the X axis direction, are misaligned along the Y axis direction. In other words, the coil 140 is disposed such that at least two of a center (a center of a rotational force) of the coil 140 at which the Lorentz force is generated, a gravity center of a rotational component including the coil 140 and the second base 110-2 and center (support center) of the first torsion bars 120*a*-1 and 120*b*-1 which support this rotational component are misaligned along the Y axis direction.

(5-2) Operation of MEMS Scanner

Next, with reference to FIG. 14, an explanation will be given to an aspect of the operation of the MEMS scanner 105 in the fifth example (specifically, an aspect of the operation of rotating the mirror 130). FIG. 14 is a plan view conceptually illustrating an aspect of the operation performed by the MEMS scanner 105 in the fifth example.

In operation of the MEMS scanner 105 in the fifth example, the controlling electrical current (namely, the controlling electrical current including the controlling electrical current for X axis driving and the controlling electrical current for Y axis driving) is supplied to the coil 140, as with the operation of the MEMS scanner 102 in the second example.

On the other hand, the magnetic field is applied to the coil 140 from the magnets 161 and 162. Incidentally, in the fifth example, the magnetic field which is applied from the magnets 161 and 162 is used not only to rotate the mirror 130 around the rotational axis which is the axis along the Y axis direction but also to rotate the second base 110-2 around the rotational axis which is the axis along the X axis direction.

The magnets 161 and 162 apply the magnetic field to the two sides of the coil 140 which face to each other along the Y axis direction. On the other hand, it is preferable that the magnets 161 and 162 do not apply the magnetic field to the two sides of the coil 140 which face to each other along the X axis direction. However, the magnets 161 and 162 may apply only a leakage flux of the magnetic field, which is to be applied to the two sides of the coil 140 which face to each other along the Y axis direction, to the two sides of the coil 140 which face to each other along the X axis direction. Namely, it is preferably that the magnets 161 and 162 do not actively apply the magnetic field to the two sides of the coil 140 which face to each other along the X axis direction. However, the magnets 161 and 162 may actively apply the magnetic field to the two sides of the coil 140 which face to each other along the X axis direction.

Here, as illustrated in FIG. 14, a condition in which the controlling electrical current flowing along a clockwise direction in FIG. 14 is supplied to the coil 140 and the magnetic field traveling from the magnet 161 to the magnet 162 is applied to the coil 140 will be explained. In this case, as illustrated in FIG. 14, the Lorentz force which acts from a back-side of the paper of FIG. 14 to a front-side of the paper is generated at one side (for example, an upper side in FIG. 14) among the two side of the coil 140 which face to each other along the Y axis direction. Similarly, as illustrated in FIG. 14, the Lorentz force which acts from the front-side of the paper of FIG. 14 to the back-side of the paper is generated at the other side (for example, a lower side in FIG. 14) among the two side of the coil 140 which face to each other along the Y axis direction. Incidentally, when a direction (namely, a polarity) of the controlling electrical current which is supplied to the coil 140 inverts, similar Lorentz force is generated (however, its direction inverts).

As a result, the Lorentz force which is generated at the coil 140 (especially, the Lorentz force depending on the controlling electrical current for X axis driving) acts with respect to the coil 140 as a rotational moment around the rotational axis which is the axis along the X axis direction. Thus, the coil 140 rotates around the rotational axis which is the axis along the X axis direction. As a result, the second base 110-2 rotates around the rotational axis which is the axis along the X axis direction, as with the second example.

In addition, in the fifth example, as described above, the rotational axis of the coil 140 along the X axis direction and the rotational axis of the second base 110-2 along the X axis direction are misaligned along the Y axis direction. Due to an unbalance which is caused by the misalignment of the rotational axes, the rotation of the coil 140 around the rotational axis which is the axis along the X axis direction propagates as a vibration to the second base 110-2. The second base 110-2 vibrates and deforms along the X axis direction, as with the second example, due to the vibration. As a result, the mirror 130 rotates around the rotational axis which is the axis along the Y axis direction.

As explained above, the MEMS scanner 105 in the fifth example is capable of enjoying various effects which the MEMS scanner 102 in the second example is capable of enjoying. In addition, the MEMS scanner 105 in the fifth example need not be provided with the magnets 151 and 152, compared to the MEMS scanner 102 in the second example. Thus, a further downsizing of the MEMS scanner 105 is capable of being realized appropriately.

(6) Sixth Example

Next, with reference to FIG. 15 to FIG. 16, a sixth example of the MEMS scanner will be explained. Incidentally, regarding a feature which is same as the feature of the above described MEMS scanner 102 in the second example, same reference number is added and its explanation will be omitted.

(6-1) Basic Configuration

Firstly, with reference to FIG. 15, a basic configuration of a MEMS scanner 106 in the sixth example will be explained. FIG. 15 is a plan view conceptually illustrating the basic configuration of the MEMS scanner 106 in the sixth example.

As illustrated in FIG. 15, the MEMS scanner 106 in the sixth example is different from the MEMS scanner 102 in the second example in that it is not provided with the magnets 151 and 152. Another feature of the MEMS scanner 106 in the sixth example may be same as another feature of the MEMS scanner 102 in the second example.

(6-2) Operation of MEMS Scanner

Next, with reference to FIG. 16, an explanation will be given to an aspect of the operation of the MEMS scanner 106 in the sixth example (specifically, an aspect of the operation of rotating the mirror 130). FIG. 16 is a plan view conceptually illustrating an aspect of the operation performed by the MEMS scanner 106 in the sixth example.

In operation of the MEMS scanner 106 in the sixth example, the controlling electrical current (namely, the controlling electrical current including the controlling electrical current for X axis driving and the controlling electrical current for Y axis driving) is supplied to the coil 140, as with the operation of the MEMS scanner 102 in the second example.

On the other hand, the magnetic field is applied to the coil 140 from the magnets 161 and 162. Incidentally, in the sixth example, the magnetic field which is applied from the magnets 161 and 162 is used not only to rotate the mirror 130 around the rotational axis which is the axis along the Y axis direction but also to rotate the second base 110-2 around the rotational axis which is the axis along the X axis direction.

The magnets 161 and 162 apply the magnetic field to the two sides of the coil 140 which face to each other along the Y axis direction. On the other hand, it is preferable that the magnets 161 and 162 do not apply the magnetic field to the two sides of the coil 140 which face to each other along the X axis direction. However, the magnets 161 and 162 may apply only a leakage flux of the magnetic field, which is to be applied to the two sides of the coil 140 which face to each other along the Y axis direction, to the two sides of the coil 140 which face to each other along the X axis direction. Namely, it is preferably that the magnets 161 and 162 do not actively apply the magnetic field to the two sides of the coil 140 which face to each other along the X axis direction.

Here, as illustrated in FIG. 16, a condition in which the controlling electrical current flowing along a clockwise direction in FIG. 16 is supplied to the coil 140 and the magnetic field traveling from the magnet 161 to the magnet 162 is applied to the coil 140 will be explained. In this case, as illustrated in FIG. 16, the Lorentz force which acts from a back-side of the paper of FIG. 16 to a front-side of the paper is generated at one side (for example, an upper side in FIG. 16) among the two side of the coil 140 which face to each other along the Y axis direction. Similarly, as illustrated in FIG. 16, the Lorentz force which acts from the front-side of the paper of FIG. 16 to the back-side of the paper is generated at the other side (for example, a lower side in FIG. 16) among the two side of the coil 140 which face to each other along the Y axis direction. Incidentally, when a direction (namely, a polarity) of the controlling electrical current which is supplied to the coil 140 inverts, similar Lorentz force is generated (however, its direction inverts).

As a result, the Lorentz force which is generated at the coil 140 (especially, the Lorentz force depending on the controlling electrical current for X axis driving) acts with respect to the coil 140 as a rotational moment around the rotational axis which is the axis along the X axis direction. Thus, the coil 140 rotates around the rotational axis which is the axis along the X axis direction. As a result, the second base 110-2 rotates around the rotational axis which is the axis along the X axis direction, as with the second example.

In addition, if the controlling electrical current which is supplied to the coil 140 includes the controlling electrical current for Y axis driving, the inventor and the like of the present invention found in his experiment that the following phenomenon occurred even when the magnetic field was not applied to the two sides of the coil 140 which face to each other along the X axis direction. Specifically, if the controlling electrical current which is supplied to the coil 140 includes the controlling electrical current for Y axis driving, the Lorentz force depending on the controlling electrical current for Y axis driving is generated at the one side (for example, the upper side in FIG. 16) among the two sides of the coil 140 which face to each other along the Y axis direction even when the magnetic field is not applied to the two sides of the coil 140 which face to each other along the X axis direction. The Lorentz force depending on the controlling electrical current for Y axis driving generates the micro vibration at the coil 140 (alternatively, the second base 110-2 on which the coil 140 is disposed). As a result, the second base 110-2 vibrates and deforms along the X axis direction, as with the second example. As a result, the mirror 130 rotates around the rotational axis which is the axis along the Y axis direction.

In addition, even when the magnetic field is not actively applied to the two sides of the coil 140 which face to each other along the X axis direction, a leakage flux of the magnetic field, which is actively applied to the two sides of the coil 140 which face to each other along the Y axis direction, may be sometimes applied to the two sides of the coil 140 which face to each other along the X axis direction. As a result, the Lorentz force depending on the controlling electrical current for Y axis driving is slightly generated at the two sides of the coil 140 which face to each other along the X axis direction. As a result, the second base 110-2 vibrates and deforms along the X axis direction, as with the second example. As a result, the mirror 130 rotates around the rotational axis which is the axis along the Y axis direction.

Incidentally, as a result of the experiment which was performed by the inventor and the like of the present invention, a gain of the rotation of the mirror 130 was 60 dB, when the magnetic field was actively applied to the two sides of the coil 140 which face to each other along the X axis direction. On the other hand, the gain of the rotation of the mirror 130 was 54 dB, when the magnetic field was not actively applied to the two sides of the coil 140 which face to each other along the X axis direction. Namely, the gain of the rotation of the mirror 130 decreases by 6 dB in the MEMS scanner in which the magnetic field is not actively applied to the two sides of the coil 140 which face to each other along the X axis direction, compared to the MEMS scanner in which the magnetic field is actively applied to the two sides of the coil 140 which face to each other along the X axis direction. However, as a result of the experiment which was performed by the inventor and the like of the present invention, the 6 dB decrease of the gain is not a decrease which could cause a large adverse effect on the operation of the MEMS scanner.

As explained above, the MEMS scanner 106 in the sixth example is capable of enjoying various effects which the MEMS scanner 102 in the second example is capable of enjoying. In addition, the MEMS scanner 106 in the sixth example need not be provided with the magnets 151 and 152, compared to the MEMS scanner 102 in the second example. Thus, a further downsizing of the MEMS scanner 106 is capable of being realized appropriately.

(7) Seventh Example

Next, with reference to FIG. 17, a seventh example of the MEMS scanner will be explained. FIG. 17 is a plan view conceptually illustrating the basic configuration of the MEMS scanner 107 in the seventh example. Incidentally, regarding a feature which is same as the feature of the above described MEMS scanner 102 in the second example, same reference number is added and its explanation will be omitted.

As illustrated in FIG. 17, the MEMS scanner 107 in the seventh example is different from the MEMS scanner 102 in the second example in that a characteristics of the first torsion bar 120a-1 is different from a characteristics of the first torsion bar 120b-1. Another feature of the MEMS scanner 107 in the seventh example may be same as another feature of the MEMS scanner 102 in the second example.

More specifically, a length (namely, a length along the X axis direction) of the first torsion bar 120a-1 may be different from a length (namely, a length along the X axis direction) of the first torsion bar 120b-1. Alternatively, a width (namely, a length along the Y axis direction) of the first torsion bar 120a-1 may be different from a width (namely, a length along the Y axis direction) of the first torsion bar 120b-1. Alternatively, a mass of the first torsion bar 120a-1 may be different from a mass of the first torsion bar 120b-1. Alternatively, a stiffness of the first torsion bar 120a-1 may be different from a stiffness of the first torsion bar 120b-1. Alternatively, a shape (for example, a shape of an appearance, a shape of a cross-section surface or the like) of the first torsion bar 120a-1 may be different from a shape (for example, a shape of an appearance, a shape of a cross-section surface or the like) of the first torsion bar 120b-1.

In this case, it is preferable that the characteristics of each of the first torsion bars 120a-1 and 120b-1 be adjusted from a viewpoint of setting positions of the node and the antinode of the deformational vibration of the second base 110-2 to appropriate positions. More specifically, it is preferable that the characteristics of each of the first torsion bars 120a-1 and 120b-1 be adjusted such that the portion corresponding to the rotational axis of each of the coil 140 and the mirror 130 along the Y axis direction becomes the node of the deformational vibration of the second base 110-2.

As explained above, the MEMS scanner 107 in the seventh example is capable of enjoying various effects which the MEMS scanner 102 in the second example is capable of enjoying. In addition, the MEMS scanner 107 in the seventh example need not match the characteristics of the first torsion bar 120a-1 with the characteristics of the first torsion bar 120b-1. Thus, a flexibility of design of the first torsion bars 120a-1 and 120b-1 becomes relatively high. If the characteristics of the first torsion bar 120a-1 matches with the characteristics of the first torsion bar 120b-1, a characteristics of the second base 110-2 is adjusted in order to set the positions of the node and the antinode of the deformational vibration of the second base 110-2 to the appropriate positions. As a result, the second base 110-2 could be larger. However, in the seventh example, the positions of the node and the antinode of the deformational vibration of the second base 110-2 are set to the appropriate positions by appropriately adjusting the characteristics of each of the first torsion bars 120a-1 and 120b-1. Thus, a further downsizing of the MEMS scanner 107 is capable of being realized appropriately.

(8) Eighth Example

Next, with reference to FIG. 18 to FIG. 19, an eighth example of the MEMS scanner will be explained. FIG. 18 is a plan view conceptually illustrating the basic configuration of the MEMS scanner 108 in the eighth example. FIG. 19 are cross-sectional views illustrating an aspect of a magnetic field applied to a coil 140 with which the MEMS scanner 108 in the eighth example is provided and an aspect of a magnetic field applied to a coil 140 with which a MEMS scanner in a comparative example in which a magnetic yoke is not disposed is provided. Incidentally, regarding a feature which is same as the feature of the above described MEMS scanner 101 in the first example, same reference number is added and its explanation will be omitted.

As illustrated in FIG. 18, the MEMS scanner 108 in the eighth example is different from the MEMS scanner 102 in the second example in that a magnetic yoke 180 is disposed on the inside of the winding of the coil 140. Another feature of the MEMS scanner 108 in the eighth example may be same as another feature of the MEMS scanner 102 in the second example.

It is preferable that the magnetic yoke 180 be disposed such that the winding of the coil 140 (one of two sides of the coil 140 which face to each other along the X axis direction in the example illustrated in FIG. 18) is inserted between the magnetic yoke 180 and the magnet 151. Furthermore, it is preferable that the magnetic yoke 180 be disposed such that the winding of the coil 140 (the other of two sides of the coil 140 which face to each other along the X axis direction in the example illustrated in FIG. 18) is inserted between the magnetic yoke 180 and the magnet 152.

It is preferable that the magnetic yoke 180 be disposed such that the winding of the coil 140 (one of two sides of the coil 140 which face to each other along the X axis direction in the example illustrated in FIG. 18) is inserted between the magnetic yoke 180 and the magnet 161. Furthermore, it is preferable that the magnetic yoke 180 be disposed such that the winding of the coil 140 (the other of two sides of the coil 140 which face to each other along the X axis direction in the example illustrated in FIG. 18) is inserted between the magnetic yoke 180 and the magnet 162.

In order to realize the above described arrangement aspect of the magnetic yoke 180, the magnetic yoke 180 may be disposed to penetrate an aperture on the inside of the windings of the coil 140. In other words, the magnetic yoke 180 may be disposed at the aperture on the inside of the windings of the coil 140 to penetrate a virtual surface whose outer edge is defined by the windings of the coil 140.

As illustrated in FIG. 19(a), according to the MEMS scanner 108 in the eighth example, the magnetic field (namely, the magnetic field for Y axis driving) which is outputted from the magnet 152 reaches to the magnet 151 via the magnetic yoke 180. Thus, according to the MEMS scanner 108 in the eighth example, the magnetic field for Y axis driving which is outputted from the magnet 152 is capable of being applied to the coil 140 easily.

On the other hand, as illustrated in FIG. 19(b), according to the MEMS scanner in the comparative example in which the magnetic yoke 180 is not disposed, the magnetic field for Y axis driving which is outputted from the magnet 152 reaches to the magnet 151 without the magnetic yoke 180. Thus, according to the MEMS scanner in the comparative example, the magnetic field for Y axis driving which is outputted from the magnet 152 is hard to be applied to the coil 140 well, compared to the MEMS scanner 108 in the eighth example.

As explained above, the MEMS scanner 108 in the eighth example is capable of increasing an efficiency of applying the magnetic field for Y axis driving from the magnets 151 and 152 to the coil 140, compared to the MEMS scanner in the comparative example. In other words, the MEMS scanner 108 in the eighth example is capable of increasing an attracting force between the magnet 151 and the magnet 152, compared to the MEMS scanner in the comparative example.

As a result, a strength of the magnetic force for Y axis driving which is applied to the coil 140 of the MEMS scanner 108 in the eighth example is capable of being same as a strength of the magnetic force for Y axis driving which is applied to the coil 140 of the MEMS scanner in the comparative example, even if the magnets 151 and 152 with which the MEMS scanner 108 in the eighth example is provided are smaller than the magnets 151 and 152 with which the MEMS scanner in the comparative example is provided. Namely, a strength of the Lorentz force which is generated at the coil 140 of the MEMS scanner 108 in the eighth example is capable of being same as a strength of the Lorentz force which is generated at the coil 140 of the MEMS scanner in the comparative example, even if the magnets 151 and 152 with which the MEMS scanner 108 in the eighth example is provided are smaller than the magnets 151 and 152 with which the MEMS scanner in the comparative example is provided (however, it is assumed that the controlling electrical current for Y axis driving which is supplied to the coil 140 of the MEMS scanner 108 in the eighth example is same as the controlling electrical current for Y axis driving which is supplied to the coil 140 of the MEMS scanner in the comparative example). Thus, a rotational aspect of the mirror 130 in the MEMS scanner 108 in the eighth example is capable of being same as a rotational aspect of the mirror in the MEMS scanner in the comparative example, even if the magnets 151 and 152 with which the MEMS scanner 108 in the eighth example is provided are smaller than the magnets 151 and 152 with which the MEMS scanner in the comparative example is provided. Therefore, a downsizing of the magnets 151 and 152 (and thus a downsizing of the MEMS scanner 108) is capable of being realized appropriately in the MEMS scanner 108 in the eighth example, compared to the MEMS scanner in the comparative example.

Alternatively, the strength of the Lorentz force which is generated at the coil 140 of the MEMS scanner 108 in the eighth example is capable of being same as the strength of the Lorentz force which is generated at the coil 140 of the MEMS scanner in the comparative example, even if the controlling electrical current (namely, the controlling electrical current for Y axis driving) which is supplied to the coil 140 of the MEMS scanner 108 in the eighth example is smaller than the controlling electrical current for Y axis driving which is supplied to the coil 140 the MEMS scanner in the comparative example (however, it is assumed that the size of the magnets 151 and 152 of the MEMS scanner 108 in the eighth example is same as the size of the magnets 151 and 152 of the MEMS scanner in the comparative example). Namely, the rotational aspect of the mirror 130 in the MEMS scanner 108 in the eighth example is capable of being same as the rotational aspect of the mirror in the MEMS scanner in the comparative example, even if the controlling electrical current for Y axis driving which is supplied to the coil 140 of the MEMS scanner 108 in the eighth example is smaller than the controlling electrical current for Y axis driving which is supplied to the coil 140 the MEMS scanner in the comparative example. Therefore, it is possible reduce a power consumption due to the controlling electrical current for Y axis driving which is supplied to the coil 140 in the MEMS scanner 108 in the eighth example, compared to the MEMS scanner in the comparative example.

Incidentally, in addition to or instead of the magnetic yoke 180, a magnet may be disposed on the inside of the winding of the coil 140. Namely, an arbitrary element which is capable of increasing the efficiency of applying the magnetic field from the magnets 151 and 152 may be disposed on the inside of the winding of the coil 140. Even in this case, it is possible to enjoy the above described various effect.

Moreover, the above described explanation focuses the magnetic field for Y axis driving which is applied from the magnets 151 and 152 to the coil 140 via the magnetic yoke 180. However, same argument can be applied to the magnetic field for X axis driving which is applied from the magnets 161 and 162 to the coil 140 via the magnetic yoke 180. Namely, the MEMS scanner 108 in the eighth example is capable of increasing an efficiency of applying the magnetic field for X axis driving from the magnets 161 and 162 to the coil 140, compared to the MEMS scanner in the comparative example. Therefore, a downsizing of the magnets 161 and 162 (and thus a downsizing of the MEMS scanner 108) is capable of being realized appropriately in the MEMS scanner 108 in the eighth example, compared to the MEMS scanner in the comparative example. Therefore, it is possible reduce a power consumption due to the controlling electrical current for X axis driving which is supplied to the coil 140 in the MEMS scanner 108 in the eighth example, compared to the MEMS scanner in the comparative example.

Moreover, in the eighth example, the MEMS scanner which drives the mirror 130 along two axes is explained. However, it goes without saying that the magnetic yoke 180 may be disposed on the inside of the winding of the coil 140 even in the MEMS scanner which drives the mirror 130 along a single axis (for example, the MEMS scanner 101 in the first example illustrated in FIG. 1).

Incidentally, one part of the components which are explained in the first example to the eighth example can be combined as occasion demand. Even in this case, the actuator, which is obtained by combining one part of the components which are explained in the first example to the eighth example, is capable of enjoying the above described various effects.

In the present invention, various changes may be made, if desired, without departing from the essence or spirit of the invention which can be read from the claims and the entire specification. A driving apparatus, which involves such changes, is also intended to be within the technical scope of the present invention.

DESCRIPTION OF REFERENCE CODES 101 to 108 MEMS scanner
110 base
110-1 first base
110-2 second base
120a, 120b torsion bar

The invention claimed is:

1. A driving apparatus comprising:
    a base part;
    a driven part which is capable of rotating;
    an elastic part which connects the base part and the driven part and which has elasticity for allowing the driven part to rotate around a rotational axis which is an axis along one direction;
    a coil part which is disposed on the base part, wherein the driven part is disposed on an outside of a winding of the coil part; and
    a magnetic field applying part which applies the magnetic field to the coil part, wherein
    a Lorentz force makes the coil part rotate around a rotational axis which is an axis along the one direction, the Lorentz force being generated at the coil part due to an electromagnetic interaction between a controlling electrical current which is supplied to the coil part and the magnetic field which the magnetic field applying part applies,
    the base part vibrates and deforms in a shape of stationary wave along another direction which is different from the one direction due to the rotation of the coil part around the rotational axis which is the axis along the one direction,
    the driven part rotates around the rotational axis which is the axis along the one direction due to the deformational vibration of the base part, and
    wherein nodes of the deformational vibration of the base part appear at positions which correspond to the rotational axis of the coil part along the one direction and the rotational axis of the driven part along the one direction, an antinode of the deformational vibration of the base part appears at a position between the rotational axis of the coil part along the one direction and the rotational axis of the driven part along the one direction.

2. The driving apparatus according to claim 1, wherein a rotational axis of the coil part along the one direction is different from the rotational axis of the driven part along the one direction.

3. The driving apparatus according to claim 1, wherein a rotational direction of the coil part around the rotational axis which is the axis along the one direction and a rotational direction of the driven part around the rotational axis which is the axis along the one direction are opposite to each other.

4. The driving apparatus according to claim 1, wherein the magnetic field applying part comprises:
    (i) a first magnetic field applying part which is disposed on the outside of the winding of the coil part; and
    (ii) a second magnetic field applying part which is disposed on an inside of the winding of the coil part.

5. The driving apparatus according to claim 4, wherein the first magnetic field applying part is a magnet and the second magnetic field applying part is a yoke.

* * * * *